United States Patent
Hattori et al.

(10) Patent No.: US 11,106,197 B2
(45) Date of Patent: Aug. 31, 2021

(54) PREDICTION MODEL CREATION APPARATUS, PRODUCTION FACILITY MONITORING SYSTEM, AND PRODUCTION FACILITY MONITORING METHOD

(71) Applicant: OMRON Corporation, KYOTO (JP)

(72) Inventors: Reiko Hattori, Souraku-gun (JP); Kosuke Tsuruta, Sakai (JP); Kota Miyamoto, Nara (JP); Yuya Ota, Kyoto (JP); Hideki Higashikage, Moriyama (JP); Yuki Hirohashi, Nara (JP); Noriyuki Oikawa, Kyoto (JP)

(73) Assignee: OMRON Corporation, Kyoto (JP)

( * ) Notice: Subject to any disclaimer, the term of this patent is extended or adjusted under 35 U.S.C. 154(b) by 568 days.

(21) Appl. No.: 15/845,238

(22) Filed: Dec. 18, 2017

(65) Prior Publication Data

US 2018/0203439 A1    Jul. 19, 2018

(30) Foreign Application Priority Data

Jan. 19, 2017   (JP) .............................. JP2017-007575

(51) Int. Cl.
*G06F 17/10* (2006.01)
*G05B 19/418* (2006.01)
(Continued)

(52) U.S. Cl.
CPC ... *G05B 19/41875* (2013.01); *G05B 23/0221* (2013.01); *G05B 23/0245* (2013.01);
(Continued)

(58) Field of Classification Search
CPC ........ G06N 20/00; G06N 7/005; G06N 5/025; G06N 5/04; G06N 5/00; G06N 20/20;
(Continued)

(56) References Cited

U.S. PATENT DOCUMENTS 5,297,151 A * 3/1994 Gruetzner ........ G01R 31/31813
714/724
2005/0114081 A1    5/2005 Fukui
(Continued)

FOREIGN PATENT DOCUMENTS

CN          104679972 A      6/2015
JP          H08-249007 A     9/1996
(Continued)

OTHER PUBLICATIONS

Kim Nam Hun et al. KR101530848B1 (Year: 2015).*
(Continued)

*Primary Examiner* — Rehana Perveen
*Assistant Examiner* — Cuong V Luu
(74) *Attorney, Agent, or Firm* — Metrolex IP Law Group, PLLC

(57) ABSTRACT

A prediction model creation apparatus includes a feature amount acquisition unit that acquires values of types of feature amounts that are calculated from operating state data indicating an operating state of a production facility that produces a product, for both a normal time at which the production facility produces the product normally and a defective time at which a defect occurs in the product that is produced, a feature amount selection unit that selects a feature amount effective in predicting the defect from among the acquired types of feature amounts, based on a predetermined algorithm that specifies a degree of association between the defect and the types of feature amounts, from the values of the types of feature amounts acquired at the normal time and the defective time, and a prediction model construction unit that constructs a prediction model for predicting occurrence of the defect, using the selected feature amount.

20 Claims, 17 Drawing Sheets

(51) Int. Cl.
    *G05B 23/02*     (2006.01)
    *G06F 17/18*     (2006.01)
    *G06N 3/02*     (2006.01)
    *G06N 5/04*     (2006.01)

(52) U.S. Cl.
    CPC ..... *G05B 23/0254* (2013.01); *G05B 23/0267* (2013.01); *G06F 17/18* (2013.01); *G06N 3/02* (2013.01); *G06N 5/04* (2013.01); *G05B 2219/32187* (2013.01); *G05B 2219/32194* (2013.01); *G05B 2219/32201* (2013.01); *G05B 2219/32222* (2013.01); *Y02P 90/02* (2015.11)

(58) Field of Classification Search
    CPC ........ G06N 3/02; G06N 3/0454; G06N 3/082; G06N 3/084; G06N 5/003; G06N 5/02; G06N 5/045; G06N 5/046; G06N 7/02; G06N 7/08; G06F 11/3447; G05B 23/0245; G05B 2219/32194
    See application file for complete search history.

(56) References Cited

U.S. PATENT DOCUMENTS

| | | | |
|---|---|---|---|
| 2005/0210337 A1* | 9/2005 | Chester | G05B 23/0254 714/47.2 |
| 2005/0288812 A1* | 12/2005 | Cheng | G05B 19/41875 700/109 |
| 2007/0135957 A1* | 6/2007 | Ogawa | G05B 17/02 700/109 |
| 2007/0265713 A1* | 11/2007 | Veillette | G05B 23/0245 700/30 |
| 2011/0276828 A1* | 11/2011 | Tamaki | G05B 23/0254 714/26 |
| 2012/0232685 A1* | 9/2012 | Wang | G06F 30/23 700/98 |
| 2012/0290879 A1 | 11/2012 | Shibuya et al. | |
| 2013/0304732 A1 | 11/2013 | Tateno | |
| 2015/0371134 A1 | 12/2015 | Chien et al. | |
| 2016/0041070 A1 | 2/2016 | Wascat et al. | |
| 2016/0076970 A1* | 3/2016 | Takahashi | G01M 13/045 702/33 |
| 2016/0210535 A1 | 7/2016 | Takimoto | |
| 2019/0101908 A1* | 4/2019 | Park | G08B 21/18 |

FOREIGN PATENT DOCUMENTS

| | | |
|---|---|---|
| JP | H09-189569 A | 7/1997 |
| JP | H11-129145 A | 5/1999 |
| JP | 2003-211209 A | 7/2003 |
| JP | 2005-121639 A | 5/2005 |
| JP | 2008-109101 A | 5/2008 |
| JP | 2009-054843 A | 3/2009 |
| JP | 2009-223362 A | 10/2009 |
| JP | 4462437 B2 | 5/2010 |
| JP | 2010-277199 A | 12/2010 |
| JP | 2011-070635 A | 4/2011 |
| JP | 2011-238769 A | 11/2011 |
| JP | 2012-146054 A | 8/2012 |
| JP | 2013-097752 A | 5/2013 |
| JP | 2013-199804 A | 10/2013 |
| JP | 2013-235542 A | 11/2013 |
| JP | 2015-170121 A | 9/2015 |
| JP | 2015-172945 A | 10/2015 |
| JP | 2016-133895 A | 7/2016 |
| WO | 2014/163039 A1 | 10/2014 |

OTHER PUBLICATIONS

KR101508641B1 (Year: 2015).*
The Japanese Office Action (JPOA) dated Jan. 28, 2020 in a counterpart Japanese patent application.
The extended European search report (EESR) dated Jun. 6, 2018 in a counterpart European Patent application.
Isobe et al., "The Energy Prediction Control System Using the Platform as the Platform, the Instrumentation", Keisou, Aug. 2009, pp. 38-42, vol. 52, No. 8, Kogyogijutsusha; Relevance is indicated in the (translated) JPOA dated Jul. 23, 2019.
The Japanese Office Action (JPOA) dated Jul. 23, 2019 in a counterpart Japanese patent application.
The Japanese Office Action dated May 14, 2019 in a counterpart Japanese Patent application.
The Japanese Office Action dated Jan. 22, 2019 in a counterpart Japanese Patent application.
Office Action (CNOA) dated Apr. 16, 2021 in a counterpart Chinese patent application.

* cited by examiner

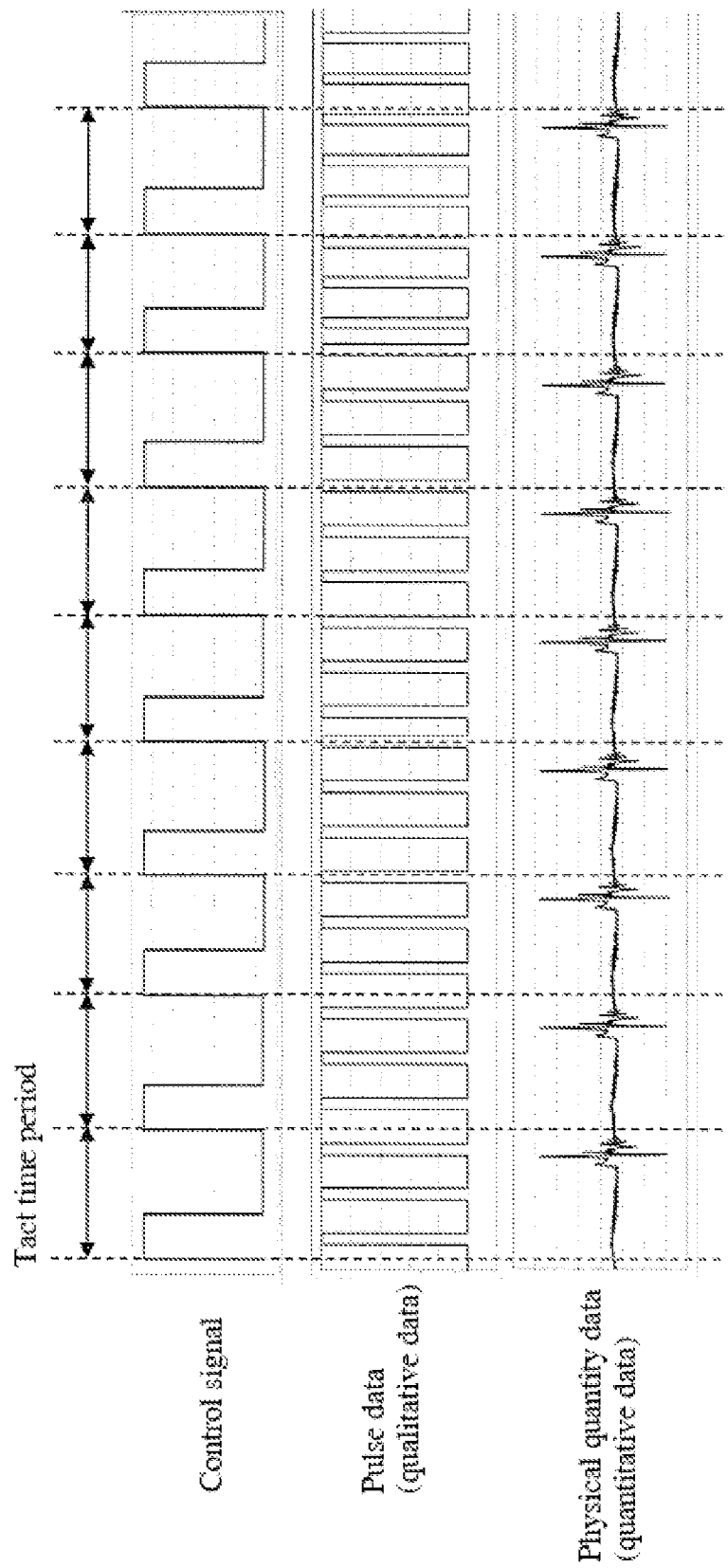

FIG. 9A

| Data No. | Servo 1 Torque Standard Deviation | Servo 2 Torque Standard Deviation | Servo 3 Torque Standard Deviation | Servo 4 Torque Standard Deviation | Servo 1 Torque Average | Servo 2 Torque Average | Servo 3 Torque Average | Servo 4 Torque Average | State |
|---|---|---|---|---|---|---|---|---|---|
| 1 | high | high | high | low | low | high | high | low | Normal |
| 2 | high | high | high | low | low | high | high | low | Normal |
| 3 | low | high | high | high | high | high | low | low | Normal |
| 4 | high | high | high | high | low | high | high | high | Normal |
| 5 | high | low | high | low | low | low | low | high | Normal |
| 6 | high | low | high | low | high | high | high | high | Normal |
| 7 | low | high | low | low | low | low | high | high | Normal |
| 8 | high | low | low | high | low | high | high | low | Normal |
| 9 | high | high | high | high | low | high | low | high | Normal |
| 10 | low | low | high | low | high | low | high | low | Normal |
| 11 | low | low | low | high | high | low | low | low | Normal |
| 12 | low | high | high | low | low | low | low | low | Normal |
| 13 | low | high | low | low | high | high | high | high | Normal |
| 14 | low | high | low | low | low | low | low | low | Normal |
| 15 | low | high | high | high | high | high | low | low | Normal |
| 16 | high | high | low | low | high | low | high | low | Normal |
| 17 | low | low | low | high | low | high | low | high | Normal |
| 18 | high | high | low | high | low | low | high | low | Normal |
| 19 | low | low | low | low | high | low | low | high | Normal |
| 20 | high | high | low | low | low | low | low | low | Defective |
| 21 | high | low | low | high | low | high | low | low | Defective |
| 22 | high | high | low | low | low | low | low | low | Defective |
| 23 | high | low | low | low | low | low | low | low | Defective |
| 24 | high | low | low | high | low | low | low | low | Defective |
| 25 | high | high | low | high | low | low | low | low | Defective |
| 26 | high | low | low | low | low | low | low | low | Defective |
| 27 | high | low | low | high | low | low | low | low | Defective |
| 28 | high | low | low | low | low | low | low | low | Defective |
| 29 | high | high | low | low | low | low | low | low | Defective |
| 30 | high | high | low | low | low | low | low | low | Defective |
| 31 | low | low | low | high | low | low | low | low | Defective |

FIG. 10A

| Data No. | Servo 1 Torque_ Standard Deviation | Servo 3 Torque_ Standard Deviation | Servo 3 Torque_ Average | State |
|---|---|---|---|---|
| 1 | high | high | high | Normal |
| 2 | high | high | high | Normal |
| 3 | low | high | low | Normal |
| 4 | high | high | high | Normal |
| 5 | high | high | high | Normal |
| 6 | high | high | low | Normal |
| 7 | low | low | high | Normal |
| 8 | high | low | high | Normal |
| 9 | high | high | low | Normal |
| 10 | low | high | high | Normal |
| 11 | low | low | high | Normal |
| 12 | low | high | low | Normal |
| 13 | low | low | low | Normal |
| 14 | low | low | low | Normal |
| 15 | low | low | low | Normal |
| 16 | high | low | high | Normal |
| 17 | low | low | low | Normal |
| 18 | high | low | high | Normal |
| 19 | low | low | high | Normal |
| 20 | high | low | low | Defective |
| 21 | high | low | low | Defective |
| 22 | high | low | low | Defective |
| 23 | high | low | low | Defective |
| 24 | high | low | low | Defective |
| 25 | high | low | low | Defective |
| 26 | high | low | low | Defective |
| 27 | high | low | low | Defective |
| 28 | high | low | low | Defective |
| 29 | high | low | low | Defective |
| 30 | high | low | low | Defective |
| 31 | low | low | low | Defective |

FIG. 10B

| State | Servo 1 Torque_ Standard Deviation | Servo 3 Torque_ Standard Deviation | Servo 3 Torque_ Average | Frequency |
|---|---|---|---|---|
| Defective | high | high | high | 0 |
| Normal | high | high | high | 4 |
| Defective | high | high | low | 0 |
| Normal | high | high | low | 2 |
| Defective | high | low | high | 0 |
| Normal | high | low | high | 3 |
| Defective | high | low | low | 11 |
| Normal | high | low | low | 0 |
| Defective | low | high | high | 0 |
| Normal | low | high | high | 1 |
| Defective | low | high | low | 0 |
| Normal | low | high | low | 2 |
| Defective | low | low | high | 0 |
| Normal | low | low | high | 3 |
| Defective | low | low | low | 1 |
| Normal | low | low | low | 4 |

FIG. 10C

| State | Servo 1 Torque_ Standard Deviation | Servo 3 Torque_ Standard Deviation | Servo 3 Torque_ Average | Frequency |
|---|---|---|---|---|
| Defective | high | high | high | 1 |
| Normal | high | high | high | 5 |
| Defective | high | high | low | 1 |
| Normal | high | high | low | 3 |
| Defective | high | low | high | 1 |
| Normal | high | low | high | 4 |
| Defective | high | low | low | 12 |
| Normal | high | low | low | 1 |
| Defective | low | high | high | 1 |
| Normal | low | high | high | 2 |
| Defective | low | high | low | 1 |
| Normal | low | high | low | 3 |
| Defective | low | low | high | 1 |
| Normal | low | low | high | 4 |
| Defective | low | low | low | 2 |
| Normal | low | low | low | 5 |

| State | Servo 1 Torque_ Standard Deviation | Servo 3 Torque_ Standard Deviation | Servo 3 Torque_ Average | Frequency | Conditional Probability |
|---|---|---|---|---|---|
| Defective | high | high | high | 1 | 0.166667 |
| Normal | high | high | high | 5 | 0.833333 |
| Defective | high | high | low | 1 | 0.25 |
| Normal | high | high | low | 3 | 0.75 |
| Defective | high | low | high | 1 | 0.2 |
| Normal | high | low | high | 4 | 0.8 |
| Defective | high | low | low | 12 | 0.923077 |
| Normal | high | low | low | 1 | 0.076923 |
| Defective | low | high | high | 1 | 0.333333 |
| Normal | low | high | high | 2 | 0.666667 |
| Defective | low | high | low | 1 | 0.25 |
| Normal | low | high | low | 3 | 0.75 |
| Defective | low | low | high | 1 | 0.2 |
| Normal | low | low | high | 4 | 0.8 |
| Defective | low | low | low | 2 | 0.285714 |
| Normal | low | low | low | 5 | 0.714286 |

PREDICTION MODEL CREATION APPARATUS, PRODUCTION FACILITY MONITORING SYSTEM, AND PRODUCTION FACILITY MONITORING METHOD

CROSS-REFERENCES TO RELATED APPLICATIONS

This application claims priority to Japanese Patent Application No. 2017-007575 filed Jan. 19, 2017, the entire contents of which are incorporated herein by reference.

FIELD

The disclosure relates to a prediction model creation apparatus, a production facility monitoring system, and a production facility monitoring method.

BACKGROUND

As a method of monitoring the state of a facility, JP 2015-172945A proposes a method that involves performing mode division by operational state based on an event signal, creating a normal model for every mode, and performing defect determination based on the created normal models. With this method, the occurrence of misreporting where normal operation is determined as defective operation is prevented, by checking the sufficiency of learning data used in creating the normal models, and setting a threshold value that is utilized in defect determination, according to the result of the check.

According to the method of JP 2015-172945A, predictors as to whether a defect will occur in the facility itself can be detected. However, in the case where a production facility that produces a product is monitored for defect predictors, there are instances where a defect occurs in the product that is produced, even though a defect has not occurred in the production facility. With the method of JP 2015-172945A, such instances where a defect occurs in the product that is produced despite a defect not occurring in the production facility itself cannot be detected.

In response to this, JP 2010-277199A proposes a method of detecting that a defect has occurred in a product that a production facility produces. Specifically, JP 2010-277199A proposes a method that involves classifying data that is collected from a production system into the case where the product is normal and the case where the product is defective, specifying a feature amount in which a significant difference occurs between the normal case and the defective case, and diagnosing whether a product is normal based on the specified feature amount.

JP 2015-172945A and JP 2010-277199A are examples of background art.

According to the method of JP 2010-277199A, it can be determined, at the time of monitoring, whether a defect has occurred in a product that a production facility produces. However, with this method, it is determined whether a product is normal, using a feature amount in which a significant difference occurs between the normal case and the defective case. Thus, determining whether there is a predictor indicating that a defect will occur in a product to be produced, that is, predicting beforehand whether a defect will occur in the product, is not possible.

One or more aspects have been made in consideration of such issues and may provide a technology that enables it to be appropriately predicted whether a defect will occur in a product that a production facility produces.

SUMMARY

One or more aspects adopt the following configurations, in order to solve the abovementioned problems.

That is, a prediction model creation apparatus according to one or more aspects includes a feature amount acquisition unit configured to acquire values of plural types of feature amounts that are calculated from operating state data indicating an operating state of a production facility that produces a product, for both a normal time at which the production facility produces the product normally and a defective time at which a defect occurs in the product that is produced, a feature amount selection unit configured to select a feature amount effective in predicting the defect that occurs in the product that is produced from among the acquired plural types of feature amounts, based on a predetermined algorithm that specifies a degree of association between the defect and the types of feature amounts, from the values of the types of feature amounts acquired at the normal time and the defective time, and a prediction model construction unit configured to construct a prediction model for predicting occurrence of the defect, using the selected feature amount.

In the above configuration, the values of plural types of feature amounts that are calculated from operating state data indicating the operating state of the production facility are collected for both a normal time at which the product is produced normally and a defective time at which a defect occurs in the product that is produced. The collected value of each feature amount is applied to a predetermined algorithm, and the degree of association between a defect that occurs in the product that is produced and each type of feature amount is thereby specified. A feature amount effective in predicting a defect that occurs in the product that is produced is then selected from among the plural types of feature amounts whose values were collected, based on the result thereof, and a prediction model for predicting the occurrence of this defect is constructed, using the selected feature amount.

There are various defects that occur in a product, and there are various causes of those defects. In the above configuration, by adopting a configuration that selects a feature amount effective in predicting a defect from among plural types of feature amounts, based on a predetermined algorithm, a feature amount having a high degree of association with the defect, that is, a feature amount that is a possible cause of the defect, is extracted. A prediction model is then created, using the extracted feature amount. Accordingly, with the above configuration, a prediction model that accurately reflects a feature amount that is a possible causative factor of a defect that occurs in a product can be created. Thus, by using this prediction model, it becomes possible to appropriately predict whether a defect will occur in a product that a production facility produces.

Also, in the prediction model creation apparatus according to the above aspects, the values of the types of feature amounts may be calculated from the operating state data divided every takt time period taken to produce a predetermined number of the product. With this configuration, the operating state of the production facility at the time of producing a predetermined number of the product is accurately reflected in the values of the feature amounts. Thus, it becomes possible to more appropriately predict whether a defect will occur in a product that a production facility produces.

Also, in the prediction model creation apparatus according to the above aspects, the feature amount selection unit may be configured to specify the degree of association between the defect that occurs in the product that is produced and the types of feature amounts, utilizing one of a Bayesian network, a decision tree, logistic regression analysis and a neural network as the predetermined algorithm, and select a feature amount effective in predicting the defect from among the acquired plural types of feature amounts, based on the specified degree of association.

Also, in the prediction model creation apparatus according to the above aspects, the prediction model may be one of a conditional probability table in which the selected feature amount is a random variable, a decision tree that utilizes the selected feature amount as a branch, a logistic regression model that utilizes the selected feature amount, a determination condition for determining occurrence of the defect based on an outlier that is calculated utilizing the selected feature amount, and a determination condition for determining occurrence of the defect based on a Mahalanobis distance that is calculated utilizing the selected feature amount.

Note that, as another form of the prediction model creation apparatus according to the above forms, an information processing method that realizes the above configurations, a program, or a storage medium readable by a computer or other apparatus, machine, or the like on which such a program is recorded may be adopted. Here, a storage medium readable by a computer or the like is a medium that stores information such as programs and the like by an electrical, magnetic, optical, mechanical or chemical operation.

Also, for example, a production facility monitoring system according to one or more aspects is provided with the prediction model creation apparatus according to any of the above forms, and a monitoring apparatus is configured to acquire operating state data from a production facility during operation, calculate a value of a feature amount used in the prediction model from the acquired operating state data, and determine whether there is a predictor of defect occurrence in a product that the production facility produces, by applying the calculated value of the feature amount to the prediction model. With this configuration, a production facility can be appropriately monitored, using the created prediction model.

Also, in the production facility monitoring system according to the above aspects, the monitoring apparatus, in a case where it is determined that there is a predictor of defect occurrence in the product that the production facility produces, may notify an administrator of the production facility that there is the predictor of defect occurrence. With this configuration, it becomes possible to inform an administrator that there is a predictor indicating that a defect will occur in a product that a production facility produces. Note that the administrator is a person who manages the production facility, and may be one person or a plurality of persons.

Also, for example, a production facility monitoring method according to one or more aspects includes acquiring values of plural types of feature amounts that are calculated from operating state data indicating an operating state of a production facility that produces a product, for both a normal time at which the production facility produces the product normally and a defective time at which a defect occurs in the product that is produced, selecting a feature amount effective in predicting the defect that occurs in the product that is produced from among the acquired plural types of feature amounts, based on a predetermined algorithm that specifies a degree of association between the defect and the types of feature amounts, from the values of the types of feature amounts acquired at the normal time and the defective time, constructing a prediction model for predicting occurrence of the defect, using the selected feature amount, acquiring operating state data from the production facility during operation, calculating a value of a feature amount used in the prediction model from the acquired operating state data, and determining whether there is a predictor of defect occurrence in the product that the production facility produces, by applying the calculated value of the feature amount to the prediction model. With this configuration, it becomes possible to appropriately predict whether a defect will occur in a product that a production facility produces.

According to one or more aspects, it becomes possible to appropriately predict whether a defect will occur in a product that a production facility produces.

BRIEF DESCRIPTION OF THE DRAWINGS

FIG. 8 is a diagram illustrating the relationship between a control signal and a takt time period.

FIG. 9A is a diagram illustrating data utilized in a working example.

FIG. 10A is a diagram illustrating data after selecting feature amounts.

FIG. 10B is a diagram illustrating a cross-tabulation table that is created from the data, such as in FIG. 10A.

FIG. 10C is a diagram illustrating a cross-tabulation table that normalizes the data, such as in FIG. 10B.

FIG. 11 is a diagram illustrating an example of a prediction model that is derived in a working example.

DETAILED DESCRIPTION

Hereinafter, one or more embodiments (hereinafter, also written as "the present embodiment") will be described based on the drawings. One or more embodiments that will be described below are, however, merely illustrative of the invention in all respects. Needless to say, various improvements and modifications can be made without departing from the scope of the invention. In other words, in implementing the invention, specific configurations that depend on the embodiment may be adopted as appropriate. Note that although data appearing in one or more embodiments will be described using natural language, it is, more specifically, pseudo language, commands, parameters, machine language and the like recognizable by computer that are designated.

1 Application Example

Figure 1:
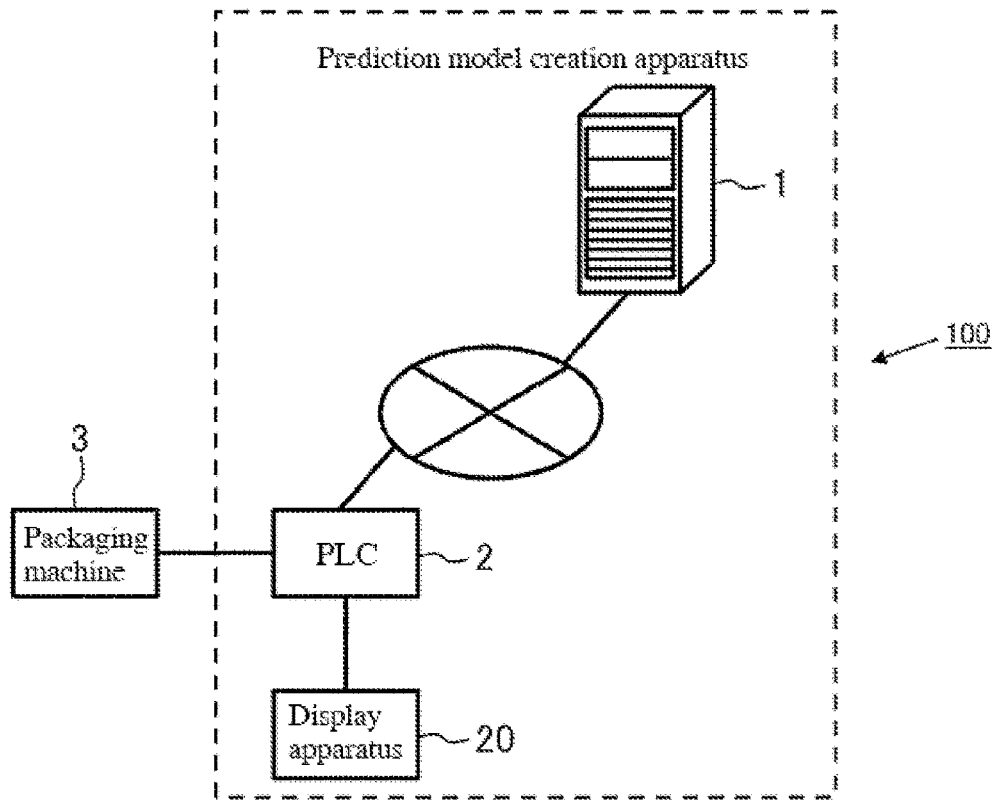
FIG. 1 is a diagram schematically illustrating an example of the configuration of a production facility monitoring system according to one or more embodiments.

First, an example of a scenario in which one or more aspects are applied will be described using FIG. 1. FIG. 1 schematically illustrates the configuration of a production facility monitoring system 100 according to one or more embodiments. The production facility monitoring system 100 according to one or more embodiments is a system that monitors whether there is a predictor of defect occurrence in a product that a production facility produces. The production facility that is monitored need not be particularly limited as long as the facility produces a product, and may be selected as appropriate according to one or more embodiments. In one or more embodiments, as shown in FIG. 1, a packaging machine 3 is illustrated as an example of a production facility that is monitored.

The packaging machine 3 is a machine that packages a content (work) with a packaging film to form a package that contains the content. The package that is formed corresponds to the "product" that the production facility produces. Also, the process of forming the package corresponds to the process of producing the product. The production facility monitoring system 100 is provided with a prediction model creation apparatus 1 and a PLC (programmable logic controller) 2 that are connected to each other via a network, in order to monitor whether there is a predictor of defect occurrence in this package.

The prediction model creation apparatus 1 is an information processing apparatus that, in order to enable detection of whether there is a predictor indicating that a defect will occur in a product, creates a prediction model for predicting the occurrence of the defect. This prediction model creation apparatus 1 acquires the values of plural types of feature amounts that are calculated from operating state data indicating the operating state of the packaging machine 3, for both a normal time at which the package is formed normally and a defective time at which the defect occurs in the formed package.

Next, the prediction model creation apparatus 1 selects a feature amount effective in predicting the defect that occurs in the package from among the acquired plural types of feature amounts, based on a predetermined algorithm that specifies the degree of association between the defect that arises and the types of feature amounts, from the values of the types of feature amounts acquired at the normal time and the defective time. The prediction model creation apparatus 1 then constructs a prediction model, using the selected feature amount. In this way, the prediction model creation apparatus 1 creates a prediction model.

On the other hand, the PLC 2 is an information processing apparatus that controls the packaging machine 3 and monitors the state of the packaging machine 3. The PLC 2 corresponds to the "monitoring apparatus" of one or more embodiments. The PLC 2 acquires the prediction model created as described above from the prediction model creation apparatus 1, in order to monitor the state of the packaging machine 3. Also, the PLC 2 acquires operating state data from the packaging machine 3 during operation, and calculates the value of the feature amount used in the above prediction model from the acquired operating state data.

The PLC 2 then determines whether there is a predictor of defect occurrence in a product that the production facility produces, by applying the calculated value of the feature amount to the prediction model. In this way, the production facility monitoring system 100 according to one or more embodiments monitors whether there is a predictor indicating that a defect will occur in a package to be formed by the packaging machine 3. Note that in the example in FIG. 1, in order to display the processing result of the PLC 2, a display apparatus 20 is connected to the PLC 2.

As described above, in one or more embodiments, a feature amount having a high degree of association with the occurrence of a defect is extracted, by adopting a configuration that selects a feature amount effective in predicting the defect (i.e., detecting a predictor of defect occurrence) from among plural types of feature amounts that can be calculated from operating state data, based on a predetermined algorithm. It is then determined whether there is a predictor indicating that the defect will occur in a package to be formed, utilizing the prediction model constructed using the extracted feature amount.

Thus, with one or more embodiments, a prediction model that accurately reflects a feature amount that is a possible causative factor of a defect that occurs in a package to be formed can be created. In addition, by utilizing this prediction model in determining whether a predictor of defect occurrence has been detected, it can be appropriately predicted whether a defect will occur in a package to be formed.

2 Configuration Example

Hardware Configuration

Next, the hardware configuration of each apparatus will be described.

Prediction Model Creation Apparatus

Figure 2:
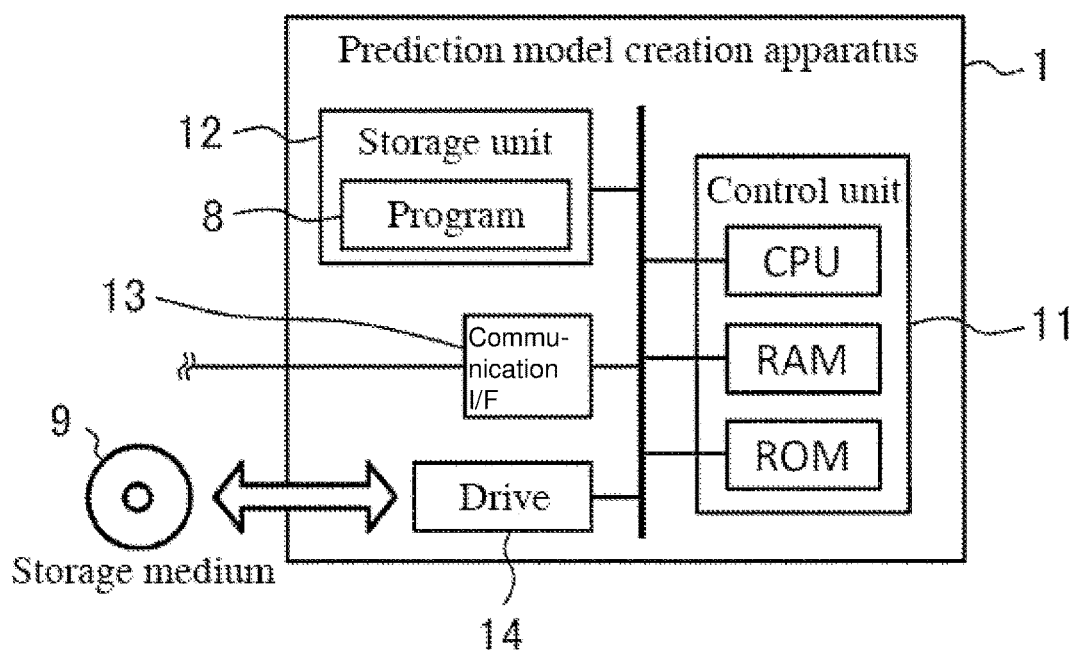
FIG. 2 is a diagram schematically illustrating an example of the hardware configuration of a prediction model creation apparatus according to one or more embodiments.

First, an example of the hardware configuration of the prediction model creation apparatus 1 according to one or more embodiments will be described using FIG. 2. FIG. 2 schematically illustrates an example of the hardware configuration of the prediction model creation apparatus 1 according to one or more embodiments. As illustrated in FIG. 2, the prediction model creation apparatus 1 is a computer to which are electrically connected a control unit 11 that includes a CPU (Central Processing Unit), a RAM (Random Access Memory), a ROM (Read Only Memory) and the like, a storage unit 12 that stores a program 8 that is executed with the control unit 11 and the like, a communication interface 13 for performing communication via a network, and a drive 14 for loading programs stored in a storage medium 9. Note that, in FIG. 2, the communication interface is denoted as "Communication I/F".

The storage unit 12 is, for example, an auxiliary storage device such as a hard disk drive or a solid-state drive, and stores the program 8. This program 8 is a program for causing the prediction model creation apparatus 1 to execute processing for creating a prediction model which will be discussed later. This program 8 may be recorded on the storage medium 9. The storage medium 9 is a medium that stores programs and other information by an electrical, magnetic, optical, mechanical or chemical operation, so as to enable the recorded programs and other information to be read by a computer or other apparatus or machine. Here, in FIG. 2, a disk-type storage medium such as a CD (Compact Disk) or a DVD (Digital Versatile Disk) is illustrated as an example of the storage medium 9. However, the type of storage medium 9 is not limited to a disk-type storage medium, and may be other than a disk-type storage medium. A semiconductor memory such as a flash memory can be given as an example of a storage medium other than a disk-type storage medium.

Note that, in relation to the specific hardware configuration of the prediction model creation apparatus 1, constituent elements can be omitted, substituted and added as appropriate according to one or more embodiments. For example, the control unit 11 may include a plurality of processors. The prediction model creation apparatus 1 may be constituted by a plurality of information processing apparatuses. Also, apart from an information processing apparatus designed only for the service that is provided, a general-purpose server apparatus or the like may be used for the prediction model creation apparatus 1.

Packaging Machine

Figure 3:
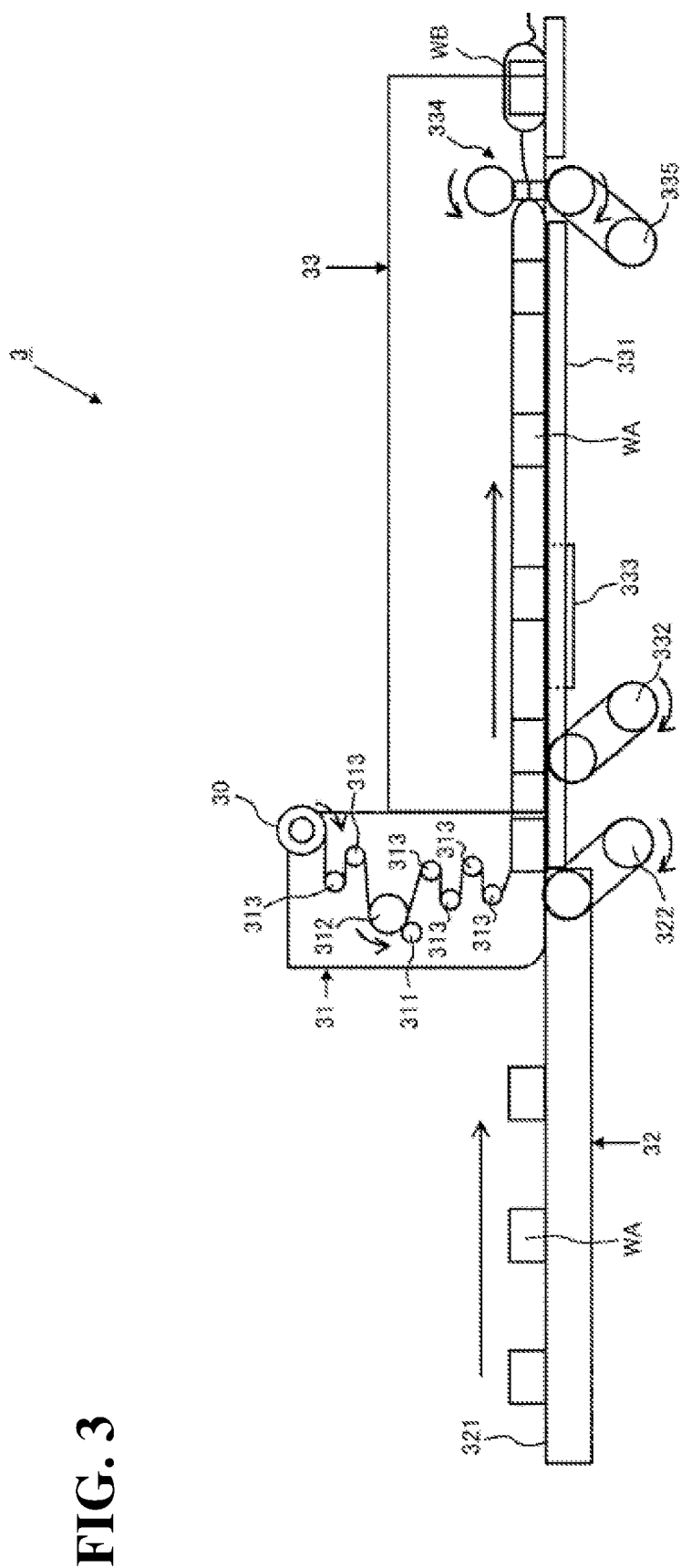
FIG. 3 is a diagram schematically illustrating an example of the configuration of a production facility according to one or more embodiments.

Next, an example of the hardware configuration of the packaging machine 3 according to one or more embodiments will be described using FIG. 3. FIG. 3 schematically illustrates an example of the hardware configuration of the packaging machine 3 according to one or more embodiments. The packaging machine 3 is a so-called horizontal pillow packaging machine. This packaging machine 3 is provided with a film roll 30 on which a packaging film is wound, a film conveyance unit 31 that conveys the packaging film, a content conveyance unit 32 that conveys a content WA, and a bag-making unit 33 that packages the content with the packaging film.

The packaging film is, for example, a resin film such as a polyethylene film. The film roll 30 is provided with a winding core, and the packaging film is wound onto the winding core. The winding core is rotatably supported about a shaft, and the film roll 30 is thereby constituted so as to be able to feed out the packaging film while rotating.

The film conveyance unit 31 is provided with a driving roller that is driven by a servo motor 311, a driven roller 312 to which torque is applied from this driving roller, and a plurality of pulleys 313 guide and tension the packaging film. The film conveyance unit 31 is configured so as to feed out the packaging film from the film roll 30 and convey the packaging film that is fed out to the bag-making unit 33 without slack.

The content conveyance unit 32 is provided with a conveyor 321 that conveys the content WA to be packaged, and a servo motor 322 that drives the conveyor 321. As illustrated in FIG. 3, the content conveyance unit 32 is coupled to the bag-making unit 33 via a lower portion of the film conveyance unit 31. The content WA that is conveyed by the content conveyance unit 32 is thereby supplied to the bag-making unit 33, and packaged using packaging film supplied from the film conveyance unit 31. Note that the type of content WA can be selected as appropriate according to one or more embodiments. For example, the content WA may be foodstuff (dried noodles, etc.), stationery (erasers, etc.) or the like.

The bag-making unit 33 is provided with a conveyor 331, a servo motor 332 that drives the conveyor 331, a center sealing unit 333 that seals the packaging film in the conveyance direction, and an end sealing unit 334 that cuts the packaging film at both ends in the conveyance direction and seals the end portions.

The conveyor 331 conveys the content WA conveyed from the content conveyance unit 32 and the packaging film supplied from the film conveyance unit 31. The packaging film supplied from the film conveyance unit 31 is supplied to the center sealing unit 333 while being folded as appropriate so that both edge portions in the width direction overlap. The center sealing unit 333 is, for example, constituted by a left-right pair of heating rollers, and seals both edge portions of the folded packaging film in the conveyance direction by heating. The packaging film is thereby tubularly formed. The content WA is inserted into this tubularly formed packaging film.

On the other hand, the end sealing unit 334 has, for example, a roller that is driven by a servo motor 335, a pair of cutters that are opened and closed by the rotation of the roller, and a heater that is provided on both sides of each cutter. The end sealing unit 334 is thereby constituted so as to be able to cut the tubular packaging film in a direction orthogonal to the conveyance direction and to seal the packaging film by heating at the cut portions. Upon passing though this end sealing unit 334, the tip portion of the tubularly formed packaging film is sealed on both sides in the conveyance direction and separated from the following packaging film to form a package WB that contains the content WA.

Packaging Process

The above packaging machine 3 is able to package the content WA with the following processes. That is, the packaging film is fed out from the film roll 30 by the film conveyance unit 31. Also, the content WA that is to be packaged is conveyed by the content conveyance unit 32. Next, the packaging film that is fed out is tubularly formed by the center sealing unit 333 of the bag-making unit 33. Having inserted the content WA into the formed tubular packaging film, the tubular packaging film is cut in a direction orthogonal to the conveyance direction by the sealing unit 334, and sealed by heating at both sides of the cut portion in the conveyance direction. A horizontal pillow package WB that contains the content WA is thereby formed. That is, packaging of the content WA is completed.

In the package WB formed in this way, the following defects, for example, can occur. In the sealing unit 334, a problem could possibly arise in which the content WA becomes sandwiched when sealing the end portions in the conveyance direction. Such a problem of the content WA becoming sandwiched in the sealing unit will, hereinafter, be referred to as "pinching". Also, in the center sealing unit 333 and/or the end sealing unit 334, a problem could possibly arise in which the sealing portion is not appropriately sealed due to the heating temperature being inappropriate. Such a problem of the sealing portion not being appropriately sealed will, hereinafter, be referred to as "seal failure". Note that pinching and seal failure are examples of defects (problems) that can occur in the package WB, and the types of defects that are predicted need not be limited thereto, and may be selected as appropriate according to one or more embodiments.

Note that, in relation to the specific hardware configuration of the packaging machine 3, constituent elements can be omitted, substituted and added as appropriate according to one or more embodiments. For example, in the packaging machine 3, a sensor for detecting the content may be provided in the content conveyance unit 32. Problems such as the content WA not being inserted into the package WB, the content WA riding up onto the end portion of the conveyor 321, and the position of the content WA shifting can thereby be prevented. Also, the packaging machine 3 may be provided with a sensor for detecting marks provided on the packaging film. The feed amount of the packaging film can thereby be specified, enabling the cutting length of the packaging film to be prevented from shifting. Also, in order to suppress changes in sealing temperature, a temperature sensor may be provided in the vicinity of the center sealing unit 333 and/or the end sealing unit 334. Also, vibration that occurs in the conveyor belts (321, 331) causes the content WA to shift in position, and pinching could possibly be caused by this. Thus, in order to detect such vibration, a sensor that measures acceleration may be attached to the conveyor belts (321, 331).

PLC

Figure 4:
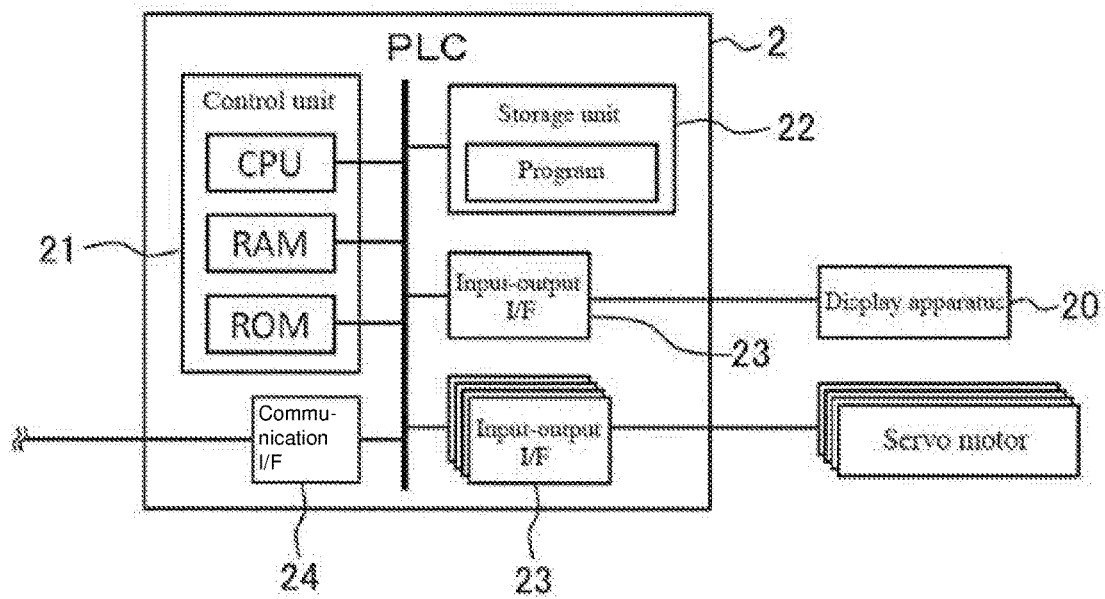
FIG. 4 is a diagram schematically illustrating an example of the hardware configuration of a monitoring apparatus according to one or more embodiments.

Next, an example of the hardware configuration of the PLC 2 will be described using FIG. 4. FIG. 4 schematically illustrates an example of the hardware configuration of the PLC 2 according to one or more embodiments. As illustrated in FIG. 4, the PLC 2 is a computer to which are electrically connected a control unit 21 that includes a CPU, a RAM, a ROM and the like, a storage unit 22 that stores a program that is executed with the control unit 21 and the like, an input-output interface 23 for connecting to an external apparatus, and a communication interface 24 for performing communication via a network. Note that, in FIG. 4, the input-output interface and the communication interface are respectively denoted as "Input-output I/F" and "Communication I/F".

The PLC 2 according to one or more embodiments is provided with a plurality of input-output interfaces 23, and servo motors (311, 322, 332, 335) of the packaging machine 3 and the display apparatus 20 are connected to the input-output interfaces 23. The PLC 2 is thereby able to control the servo motors (311, 322, 332, 335) of the packaging machine 3 and the display apparatus 20, via the input-output interfaces 23.

The type of display apparatus 20 can be selected as appropriate according to one or more embodiments. The display apparatus 20 is, for example, a display or a display device. The PLC 2 is, for example, able to output the processing result of the control unit 21 to the display apparatus 20. Also, the PLC 2 is able to adjust the feed amount of the packaging film and the conveyance speed of the content WA, by controlling the torque of the servo motors (311, 322, 332, 335).

Note that, in relation to the specific hardware configuration of the PLC 2, constituent elements can be omitted, substituted and added as appropriate according to one or more embodiments. For example, the control unit 21 may also include a plurality of processors. Also, the PLC 2 may be provided with an input apparatus for an operator to perform input operations. The input apparatus may, for example, be constituted by buttons and the like.

Functional Configuration

Next, the functional configurations of the prediction model creation apparatus 1 and the PLC 2 will be described.

Prediction Model Creation Apparatus

Figure 5:
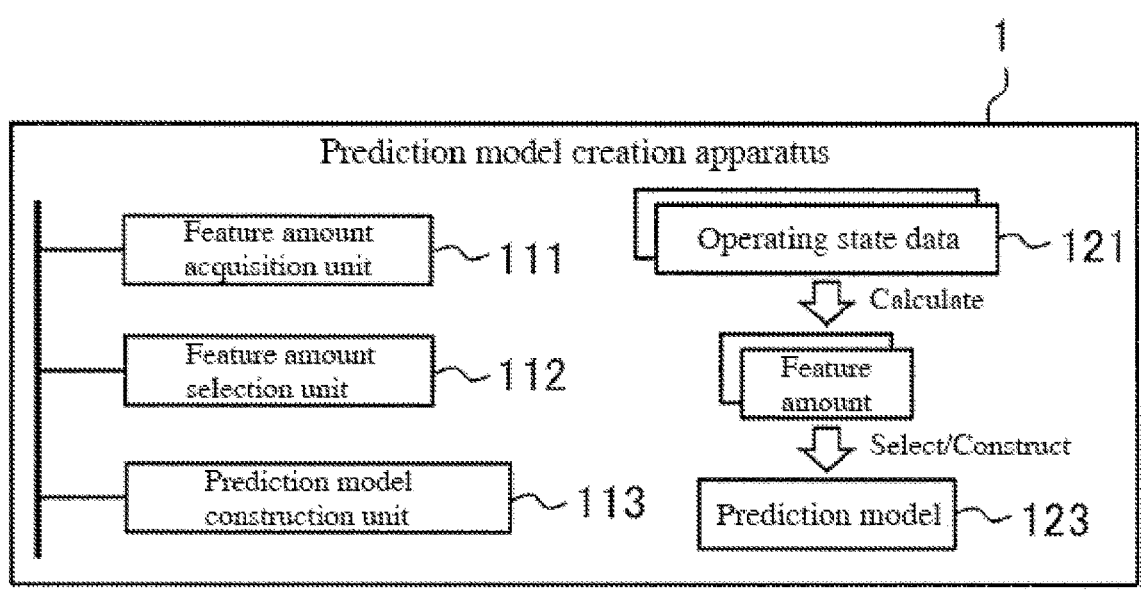
FIG. 5 is a diagram schematically illustrating an example of the functional configuration of a prediction model creation apparatus according to one or more embodiments.

First, an example of the functional configuration of the prediction model creation apparatus 1 according to one or more embodiments will be described using FIG. 5. FIG. 5 schematically illustrates an example of the functional configuration of the prediction model creation apparatus 1 according to one or more embodiments. The control unit 11 of the prediction model creation apparatus 1 loads the program 8 stored in the storage unit 12 to the RAM. The control unit 11 then controls the constituent elements as a result of the CPU interpreting and executing the program 8 loaded to the RAM. As illustrated in FIG. 5, the prediction model creation apparatus 1 according to one or more embodiments thereby functions as a computer that is provided with a feature amount acquisition unit 111, a feature amount selection unit 112 and a prediction model construction unit 113.

The feature amount acquisition unit 111 acquires the values of plural types of feature amounts that are calculated from operating state data 121 that indicates the operating state of the packaging machine 3, for both a normal time at which the package WB is formed normally by the packaging machine 3, which is the production facility, and a defective time at which a defect occurs in the package WB that is formed. The feature amount selection unit 112 selects a feature amount effective in predicting the defect that occurs in the package WB to be formed from among the acquired plural types of feature amounts, based on a predetermined algorithm that derives the degree of association between the defect and the types of feature amounts, from the acquired values of the types of feature amounts at both the normal time and defective time. The prediction model construction unit 113 then constructs a prediction model 123 for predicting the occurrence of the defect, using the selected feature amount.

PLC

Figure 6:
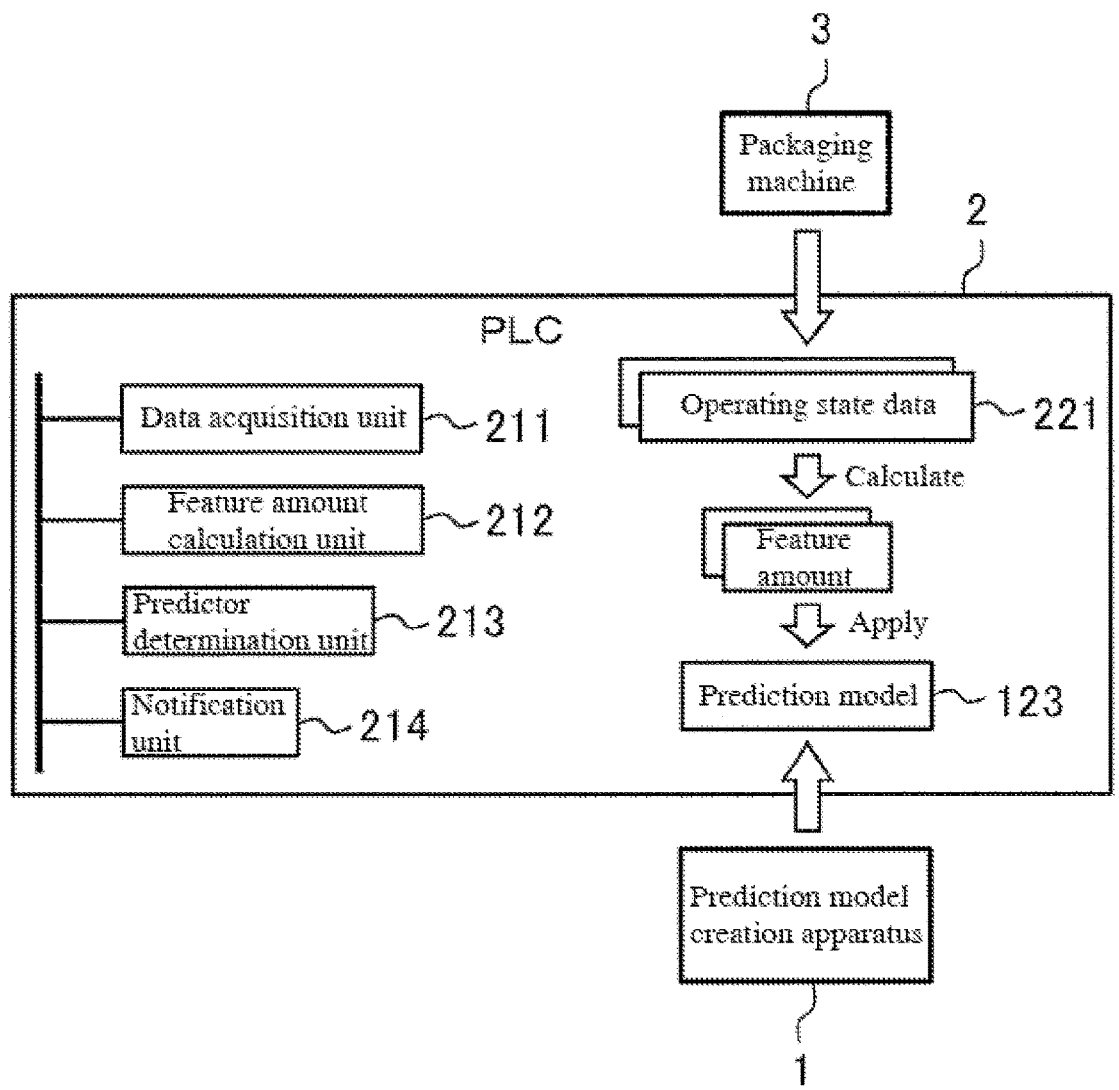
FIG. 6 is a diagram schematically illustrating an example of the functional configuration of a monitoring apparatus according to one or more embodiments.

Next, an example of the functional configuration of the PLC 2 according to one or more embodiments will be described using FIG. 6. FIG. 6 schematically illustrates an example of the functional configuration of the PLC 2 according to one or more embodiments. The control unit 21 of the PLC 2 loads the program stored in the storage unit 22 to the RAM. The control unit 21 then controls the constituent elements by the CPU interpreting and executing the program loaded to the RAM. As illustrated in FIG. 6, the PLC 2 according to one or more embodiments is thereby able to function as a computer that is provided with a data acquisition unit 211, a feature amount calculation unit 212, a predictor determination unit 213 and a notification unit 214.

The data acquisition unit 211 acquires operating state data 221 from the packaging machine 3 during operation. The feature amount calculation unit 212 calculates the value of the feature amount used in the above prediction model 123 from the acquired operating state data 221. The predictor determination unit 213 acquires the prediction model 123 from the prediction model creation apparatus 1, and determines whether there is a predictor of defect occurrence in the package WB to be formed by the packaging machine 3, by applying the calculated value of the feature amount to the acquired prediction model 123. The notification unit 214, in the case where it is determined that there is a predictor of defect occurrence in the package WB to be formed by the packaging machine 3, notifies the administrator of the packaging machine 3.

Other Matters

The functions of the prediction model creation apparatus 1 and the PLC 2 will be described in detail with an operation example that will be discussed below. Note that, in one or more embodiments, examples are described in which the above functions of each apparatus are realized by a general-purpose CPU. However, some or all of the above functions may be realized by one or a plurality of dedicated processors. Also, in relation to the functional configuration of the prediction model creation apparatus 1 and the PLC 2, functions may be omitted, substituted and added as appropriate according to one or more embodiments.

3 Operation Example

Next, an example of the operation of the production facility monitoring system 100 will be described. The processing procedure of the production facility monitoring system 100 that will be described below corresponds to the "production facility method" of one or more embodiments. The processing procedure described below is, however, merely an example, and the respective processing may be changed to the extent possible. Also, with regard to the processing procedure that will be described below, steps may be omitted, substituted and added as appropriate according to one or more embodiments. Note that the operation of the production facility monitoring system 100 can be divided into two parts, namely, a part in which the prediction model 123 is created by the prediction model creation apparatus 1, and a part in which the state of the packaging machine 3 is monitored by the PLC 2 utilizing the created prediction model 123. Hereinafter, an example of the operations of each part will be described.

Creation of Prediction Model

Figure 7:
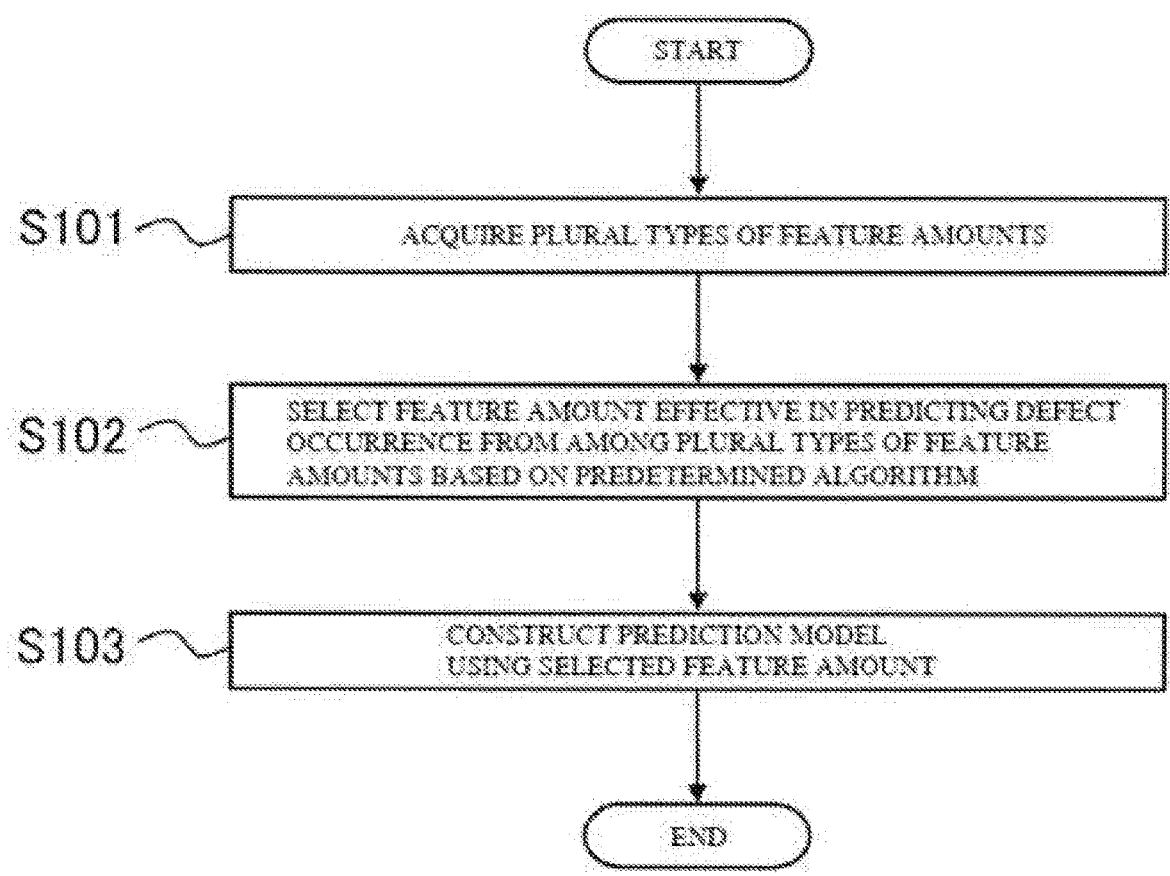
FIG. 7 is a diagram illustrating an example of the processing procedure of a prediction model creation apparatus at the time of creating a prediction model.

First, the processing procedure at the time of the prediction model creation apparatus 1 creating the prediction model 123 will be described using FIG. 7. FIG. 7 illustrates an example of the processing procedure of the prediction model creation apparatus 1 at the time of creating the prediction model 123.

Step S101

In the first step S101, the control unit 11 of the prediction model creation apparatus 1 functions as the feature amount acquisition unit 111, and acquires the values of plural types of feature amounts that are calculated from the operating state data 121 indicating the operating state of the packaging machine 3, for both the normal time at which the packaging machine 3 forms the package WB normally and the defective time at which a defect occurs in the package WB that is formed.

Specifically, first, the control unit 11 classifies and collects the operating state data 121 into data obtained at the normal time and data obtained at the defective time. The type of operating state data 121 that is collected need not be particularly limited, as long as the data indicates the state of the production facility (packaging machine 3). The operating state data 121 may, for example, be measurement data for torque, speed, acceleration, temperature, pressure and the like. In the case where each servo motor of the packaging machine 3 is provided with an encoder, the control unit 11 is able to acquire the measurement data for the torque and speed of each servo motor measured by the encoder as the operating state data 121.

Also, the operating state data 121 may, for example, be detection data indicating the detection result by a sensor such as an infrared sensor. In the case where the packaging machine 3 is provided with a sensor for detecting the content WA, the control unit 11 is able to acquire, as the operating state data 121, the detection result of this sensor, that is, detection data indicating with "on" and "off" whether the content WA exists. Note that the collected operating state data 121 may be stored in the storage unit 12, or may be stored in an external storage device.

Next, the control unit 11 divides the collected operating state data 121 into frames, in order to stipulate the processing range for calculating the feature amount. For example, the control unit 11 may divide the operating state data 121 into frames of a fixed length of time. The packaging machine 3 need not, however, necessarily operate at intervals of a fixed time period. Thus, when the operating state data 121 is divided into frames of a fixed length of time, the operations of the packaging machine 3 that are reflected in the respective frames may be misaligned.

In view of this, in one or more embodiments, the control unit 11 performs frame division of the operating state data 121 every takt time period. The takt time period is the time taken to produce a predetermined number of products, that is, to form a predetermined number of packages WB. This takt time period can be specified based on a signal that controls the packaging machine 3, such as the control signal with which the PLC 2 controls the operation of each servo motor of the packaging machine 3 or the like, for example.

The relationship between the control signal and takt time period will be described using FIG. 8. FIG. 8 schematically illustrates the relationship between the control signal and the takt time period. As illustrated in FIG. 8, the control signal for a production facility that repeatedly produces a product such as the packaging machine 3 is a pulse signal in which "on" and "off" appear periodically according to the production of a predetermined number of products.

For example, with the control signal illustrated in FIG. 8, "on" and "off" appear once each while forming a predetermined number of packages WB. In view of this, the control unit 11 is able to acquire this control signal from the PLC 2, and set the time period from the rising edge ("on") of the acquired control signal to the next rising edge ("on") as the takt time period. The control unit 11 is then able to divide the operating state data 121 into frames every takt time period, as illustrated in FIG. 8.

Note that the type of control signal need not be particularly limited, as long as the signal can be utilized for controlling the packaging machine 3. For example, in the case where the packaging machine 3 is provided with a sensor for detecting marks provided on the packaging film, and the output signal of this sensor is utilized in adjusting the feed amount of the packaging film, the output signal of this sensor may be utilized as the control signal.

Next, the control unit 11 calculates the value of the feature amount from each frame of the operating state data 121. The type of feature amount need not be particularly limited, as long as a feature of the production facility is shown.

For example, in the case where the operating state data 121 is quantitative data (physical quantity data in FIG. 8) such as the above measurement data, the control unit 11 may calculate the amplitude, maximum, minimum, average, variance, standard deviation, autocorrelation coefficient, maximum of the power spectrum obtained by Fourier transform, skewness, kurtosis and the like in each frame as feature amounts.

Also, for example, in the case where the operating state data 121 is qualitative data (pulse data in FIG. 8) such as the above detection data, the control unit 11 may calculate the "on" time, "off" time, duty ratio, "on" frequency, "off" frequency and the like in each frame as feature amounts.

Furthermore, the feature amount may be derived not only from a single instance of operating state data 121 but also from a plurality of instances of operating state data 121. For example, the control unit 11 may calculate the cross-correlation coefficient, ratio, difference, synchronization deviation, distance and the like between frames corresponding to two types of operating state data 121 as feature amounts.

The control unit 11 calculates plural types of feature amounts such as the above from the operating state data 121. The control unit 11 is thereby able to acquire the values of plural types of feature amounts that are calculated from the operating state data 121 for both the normal time and the defective time. Note that a configuration may be adopted in which the processing from collection of the operating state data 121 to calculation of the values of the feature amounts is performed by the PLC 2 rather than the prediction model creation apparatus 1. That is, the prediction model creation apparatus 1 may acquire the values of plural types of feature amounts that are calculated from the operating state data 121, by obtaining the processing result of the PLC 2. Also, the control unit 11 may discretize the values of the types of feature amounts, such that a state higher than a threshold value is "1" and a state lower than the threshold value is "0", for example.

Step S102

In the following step S102, the control unit 11 functions as the feature amount selection unit 112, and selects a feature amount effective in predicting a defect that occurs in the package WB that is formed from among the acquired plural types of feature amounts, based on a predetermined algorithm that specifies the degree of association between the defect and the types of feature amounts, from the values of the types of feature amounts at both the normal time and the defective time acquired in step S101.

The predetermined algorithm may be configured utilizing a Bayesian network, for example. A Bayesian network is one type of graphical modeling that represents the causal relationship between a plurality of random variables in a directed acyclic graph structure, and represents the causal relationship between the random variables by conditional probability.

The control unit 11 is able to derive the causal relationship between each feature amount and the state of the package WB, by treating the acquired feature amounts and the state of the package WB as random variables, that is, by constructing a Bayesian network with the acquired feature amounts and state of the package WB set as nodes. A well-known method may be used in constructing the Bayesian network. For example, structure learning algorithms such as the greedy algorithm, the stingy algorithm and the full search method can be used in constructing the Bayesian network. Also, as evaluation criteria of the Bayesian network that is constructed, AIC (Akaike's Information Criterion), C4.5, CHM (Cooper Herskovits Measure), MDL (Minimum Description Length), ML (Maximum Likelihood) and the like can be used. Also, pairwise deletion, listwise deletion or the like can be used as the processing method in the case where missing values are included in learning data (operating state data 121) that is utilized in constructing the Bayesian network.

Note that the method that treats the acquired feature amounts and the state of the package WB as random variables can be set as appropriate according to one or more embodiments. For example, the state of the package WB can be regarded as a random variable, by setting a phenomenon where the package WB is normal as "0" and a phenomenon where a defect arises in the package WB as "1", and associating probabilities with the respective phenomena. Also, for example, the state of each feature amount can be regarded as a random variable, by setting a phenomenon where the value of the feature amount is less than or equal to a threshold value as "0" and a phenomenon where the value of the feature amount exceeds the threshold value as "1", and associating probabilities with the respective phenomena. The number of states that are set for each feature amount need not, however, be limited to two, and may be three or more.

The control unit 11 is then able to calculate the degree of association of each feature amount with the state of the product, by comparing the posterior probability of each feature amount (explanatory variable) in the case where the state of the package WB is normal with the posterior probability of each feature amount in the case where the state of the package WB is defective, utilizing the constructed Bayesian network. For example, a degree of association $I_i$ of an explanatory variable (feature amount) i can be defined as in the following equation 1.

$$I_i = \frac{|b_i - a_i|}{\sum_{i=1}^{n} |b_i - a_i|} \qquad \text{Equation 1}$$

$a_i$ is the value of the posterior probability of the explanatory variable i in the case where the state of the package WB is normal, and $b_i$ is the value of the posterior probability of the explanatory variable i in the case where the state of the package WB is defective. Also, n shows the number of explanatory variables that are targeted. This $I_i$ shows the degree of influence on the state of the package WB. That is, the explanatory variable i has a higher degree of association with defect occurrence in the package WB as the value of $I_i$ increases. The control unit 11 is able to calculate the value of each posterior probability, by utilizing an inference algorithm such as MSSM (Modified Systematic Sampling Method) or loopy BP (Loopy Belief Propagation), for example.

The control unit 11 appropriately selects, as a feature amount effective in predicting defect occurrence, one or a plurality of feature amounts having a high degree of association, out of the plural types of feature amounts acquired in step S101, based on the above calculation result. For example, the control unit 11 may select one or a plurality of feature amounts in descending order from the feature amount whose value of the degree of association $I_i$ is highest, as feature amounts effective in predicting defect occurrence. Also, the control unit 11 may select a feature amount effective in predicting a defect from among the plural types of feature amounts acquired in step S101, by outputting the result of calculating the degree of association $I_i$ of each feature amount, and accepting designation of one or a plurality of feature amounts from a user who views the calculation results. Note that the number of feature amounts that can be selected as a feature amount effective in predicting a defect may be set as appropriate according to one or more embodiments, and may be one or a plurality.

Step S103

In the following step S103, the control unit 11 functions as the prediction model construction unit 113, and constructs the prediction model 123 for predicting occurrence of the defect, using the one or plurality of feature amounts selected in step S102.

The method of constructing the prediction model 123 can be selected as appropriate according to one or more embodiments. For example, in the above step S102, the causal relationship between each feature amount and the state of the package WB is represented by a Bayesian network. In view of this, the control unit 11 may construct, as the prediction model 123, a conditional probability table in which the feature amounts selected in step S102 are random variables. In other words, the control unit 11 may construct, as the prediction model 123, a conditional probability table showing the probability that the defect will occur in the package WB for the selected feature amounts, utilizing the Bayesian network constructed in step S102. Note that the method of deriving a conditional probability table showing the probability of defect occurrence in the package WB for the selected feature amounts may be selected as appropriate according to one or more embodiments. For example, the control unit 11 may reconstruct the Bayesian network for the feature amounts selected in step S102, using the above structural learning algorithm, and calculate a conditional probability table showing the probability of defect occurrence in the package WB for the selected feature amounts, based on the reconstructed Bayesian network. With this conditional probability table, the probability of a defect occurring in the package WB can be derived, according to the values of the selected feature amounts.

As described above, the prediction model creation apparatus 1 is able to create the prediction model 123. Note that in the case where there are plural types of defect events that are targeted for predicting occurrence, the prediction model creation apparatus 1 create the prediction model 123 by executing the processing of the above steps S101 to S103 for every defect event. The prediction models 123 corresponding to different defect events are, however, not prevented from consequently becoming the same. The prediction model creation apparatus 1 may save the prediction model 123 created for every defect event in the storage unit 12 or in an external storage device.

Also, after creating the prediction model 123 for a target defect event, the control unit 11 may store new operating state data 121 for when the target defect event occurs (defective time) and when the target defect event does not occur (normal time). The control unit 11 may then update the prediction model 123 by adding the newly stored operating state data 121 and reexecuting the processing of the above steps S101 to S103.

Working Example

Next, a working example of the process involved in creating the prediction model 123 by the processing of the above steps S101 to S103 will be described. The present invention is, however, not limited to the following working example.

In order to create a prediction model for predicting the occurrence of pinching in a horizontal pillow packaging machine having the same configuration as the above packaging machine 3, operating state data when pinching occurred and when pinching did not occur was collected under the following conditions, and the value of each feature amount was calculated from the collected operating state data. A Bayesian network was then constructed from the calculated values of the feature amounts, utilizing well-known software (BAYONET: provided by NTT DATA Mathematical Systems Inc.).

Operating state data (4×31 instances): torque measurement data for each servo motor Torque measurement method: servo control information of PLC Control signal: pulse signal indicating detection of mark provided on packaging film by sensor provided in film conveyance unit Feature amount (8 types): average and standard deviation for torque of each servo motor Threshold value set for average: average at normal time Threshold value set to standard deviation: average at defective time Note that, for convenience of description, the servo motor of the film conveyance unit will also be referred to as the "first servo motor", the servo motor of the conveyor of the bag-making part will also be referred to as the "second servo motor", the servo motor of the sealing unit will also be referred to as the "third servo motor", and the servo motor of the conveyor of the content conveyance unit will also be referred to as the "fourth servo motor". The values of the feature amounts were discretized using the above threshold values.

Figure 9B:
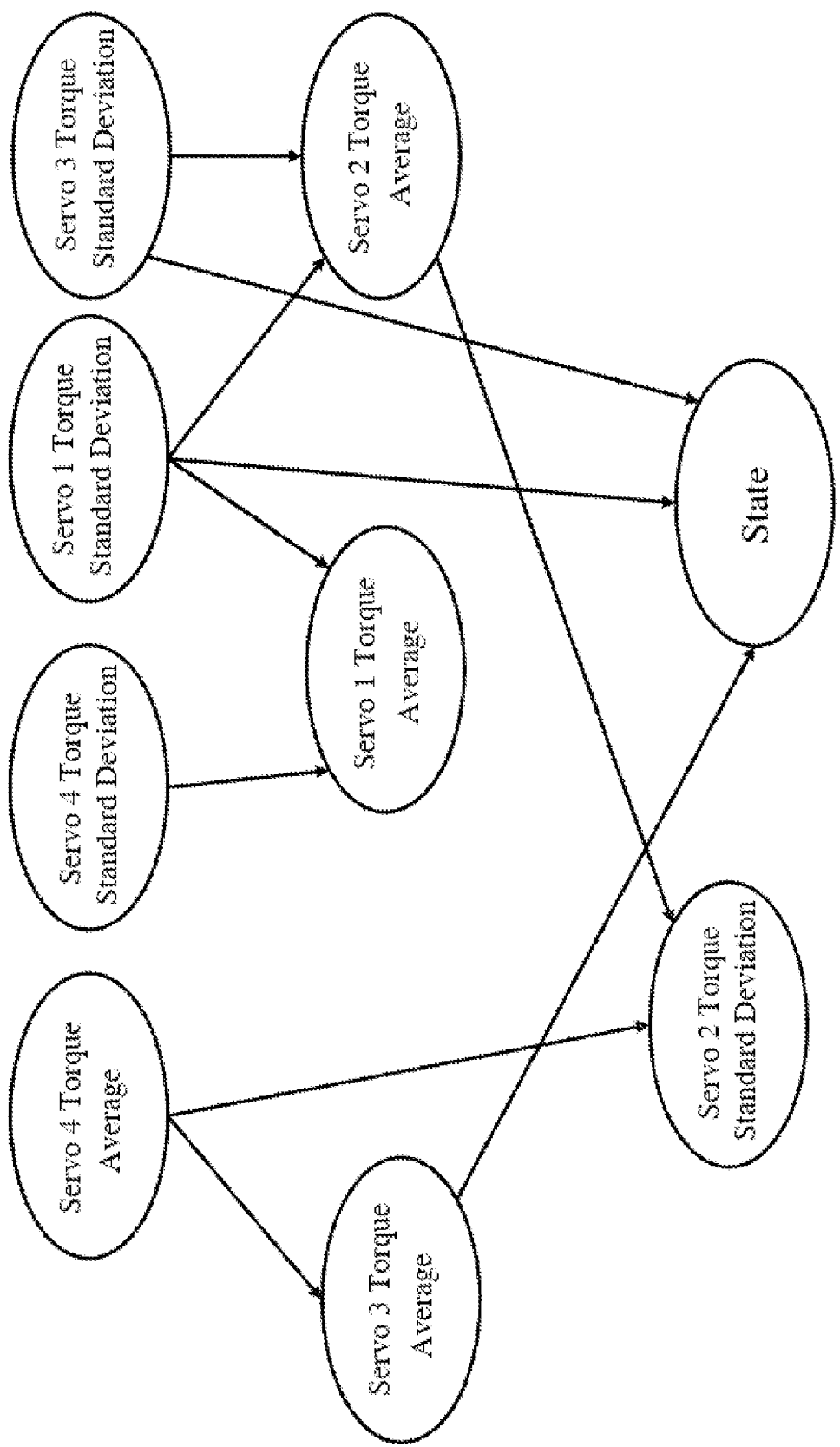
FIG. 9B is a diagram illustrating a Bayesian network that is constructed in a working example.
Figure 9C:
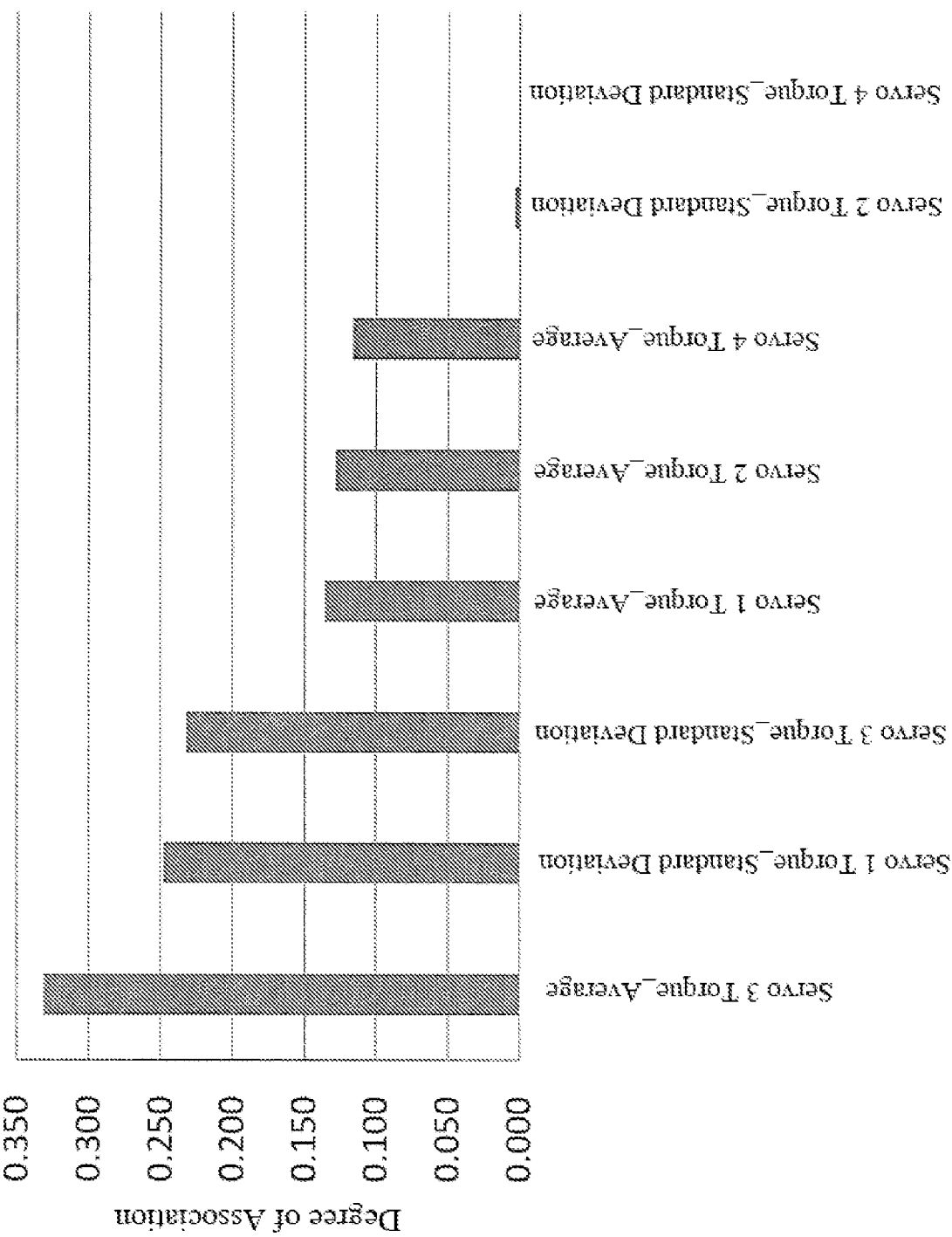
FIG. 9C is a graph illustrating the degree of association between feature amounts that are derived from a Bayesian network, such as in FIG. 9B, and the occurrence of pinching.

FIG. 9A shows the values of the feature amounts that are obtained from the collected operating state data. FIG. 9B shows a Bayesian network that is constructed from the data shown in FIG. 9A. Also, FIG. 9C shows the degree of association between each feature amount and the occurrence of pinching that is derived from the Bayesian network shown in FIG. 9B. As shown in FIG. 9B and FIG. 9C, it is evident from the constructed Bayesian network that, in the above packaging machine, the average and standard deviation for torque of the third servo motor and the standard deviation for torque of the first servo motor, out of the above eight types of feature amounts, are highly associated with the occurrence of pinching. In view of this, a conditional probability table showing the probability that pinching will occur in these three types of feature amounts was derived, utilizing the Bayesian network shown in FIG. 9B.

FIG. 10A shows data after selecting feature amounts. Specifically, first, the cross-tabulation table shown in FIG. 10B was created from the data shown in FIG. 10A, by totaling the states for every combination of an input item and a result. Next, the cross-tabulation table shown in FIG. 10C was created, by normalizing the frequency data of the cross-tabulation table shown in FIG. 10B using the MAP method, or, specifically, by adding one to the frequency of each condition. The conditional probability of each state was then calculated by dividing the respective frequencies of both the normal state and the defective state by the sum of both frequencies, for the same conditions of the standard deviation for torque of the first servo motor and the standard deviation and average for torque of the third servo motor, based on the cross-tabulation table shown in FIG. 10C. A conditional probability table was created by performing this processing for all conditions.

FIG. 11 shows the conditional probability table (prediction model 123) that is obtained as a result of the above. With this conditional probability table, the probability that pinching will occur in the package that is formed can be derived, according to the values of the average and standard deviation for torque of the third servo motor and the standard deviation for torque of the first servo motor. For example, in the case where both the average and standard deviation for torque of the third servo motor are smaller than the threshold value and standard deviation for torque of the first servo motor is larger than the threshold value, the probability that pinching will occur in the package that is formed can be derived as 92.3%. Also, for example, in the case where both the average and standard deviation for torque of the third servo motor are larger than the threshold value and standard deviation for torque of the first servo motor is smaller than the threshold value, the probability that pinching will occur in the package that is formed can be derived as 33.3%. Note that, in FIG. 9A to FIG. 11, "first servo motor", "second servo motor", "third servo motor" and "fourth servo motor" are respectively denoted as "Servo 1", "Servo 2", "Servo 3", and "Servo 4".

Monitoring of Packaging Machine

Figure 12:
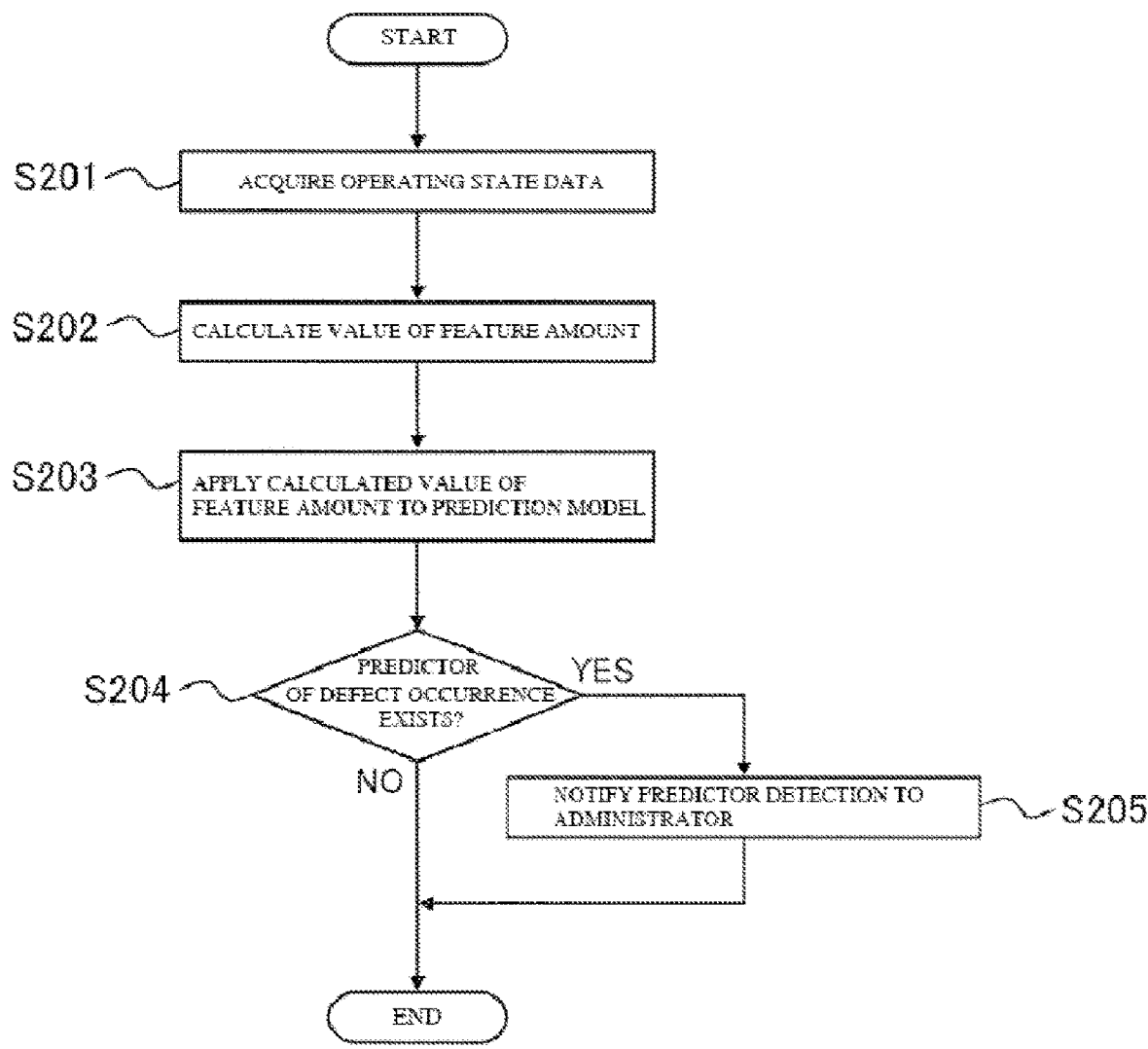
FIG. 12 is a diagram schematically illustrating an example of the processing procedure of a monitoring apparatus at the time of monitoring whether there is a predictor of defect occurrence in a product that a production facility produces.

Next, the processing procedure of the PLC 2 at the time of monitoring the state of the package WB will be described using FIG. 12. FIG. 12 shows an example of the processing procedure of the PLC 2 at the time of monitoring whether there is a predictor of defect occurrence in the package WB to be formed by the packaging machine 3.

Steps S201 and S202

First, in step S201, the control unit 21 of the PLC 2 functions as the data acquisition unit 211, and acquires the operating state data 221 from the packaging machine 3 during operation. In the following step S202, the control unit 21 calculates the value of the feature amount used in the prediction model 123 from the operating state data 221 acquired in step S201.

In the case of the above working example, the control unit 21, in step S201, acquires the measurement data for torque from each servo motor of the packaging machine as the operating state data 221. The control unit 21, in step S202, then calculates the values of the average and variance for torque of the third servo motor and the variance for torque of the first servo motor, utilizing the measurement data for torque of the first and third servo motors out of the acquired measurement data for torque of the servo motors.

Steps S203 and S204

In the following step S203, the control unit 21 functions as the predictor determination unit 213, and applies the value of the feature amount calculated in step S202 to the prediction model 123 acquired from the prediction model creation apparatus 1. In the following step S204, the control unit 21 then determines whether there is a predictor of defect occurrence in the package WB to be formed by the packaging machine 3, based on the application result of step S203.

In the case where it is determined that there is a predictor indicating that a defect will occur in the package WB to be formed, the control unit 21 advances the processing to the following step S205. On the other hand, in the case where it is determined that there is not a predictor of defect occurrence in the package WB to be formed, the control unit 21 omits the processing of the following step S205 and ends the processing according to this operation example.

In the case of the above working example, the control unit 21, in step S203, applies the values of the average and variance for torque of the third servo motor and the variance for torque of the first servo motor calculated in step S202 to the above conditional probability table. The control unit 21 is thereby able to calculate the value of the probability that pinching will occur in the package WB. In view of this, the control unit 21, in step S204, compares the calculated value of probability and the set threshold value.

In the case where the calculated value of probability exceeds the threshold value, the control unit 21 then determines that there is a predictor indicating that pinching will occur in the package WB, and advances the processing to the following step S205. On the other hand, in the case where the calculated value of probability is less than or equal to the threshold value, the control unit 21 determines that there is not a predictor indicating that pinching will occur in the package WB, omits the processing of the following step S205, and ends the processing related to this operation example.

For example, when the average and variance for torque of the third servo motor are smaller than the threshold value and variance for torque of the first servo motor is larger than the threshold value, in the case where the threshold value is set to 90%, the control unit 21 advances the processing to the following step S205. On the other hand, when the average and variance for torque of the third servo motor are larger than the threshold value and variance for torque of the first servo motor is smaller than the threshold value, the control unit 21 omits the processing of the following step S205, and ends the processing related to this operation example.

Such determination using a threshold value can be utilized in cases other than the above working example. That is, in the case where the prediction model 123 is a type that outputs the degree of possibility of defect occurrence, the control unit 21 is able to determine whether there is a predictor of defect occurrence in the product to be produced, by comparing the value that is output with the threshold value. Note that the threshold value that is used in this determination can be changed as appropriate by a user.

Step S205

In the following step S205, the control unit 21 functions as the notification unit 214, and notifies the administrator that there is a predictor of defect occurrence in the package WB to be formed by the packaging machine 3. The control unit 21 thereby ends the processing related to this operation example.

The method of notification may be selected as appropriate according to one or more embodiments. For example, the control unit 21 may display a screen for informing that there is a predictor of defect occurrence in the package WB, on the display apparatus 20 that is connected to the PLC 2. Also, for example, the control unit 21 may perform the notification to a user terminal of the administrator by e-mail, short message or the like. In this case, information indicating the notification destination such as an e-mail address or a telephone number may be preregistered in the storage unit 22 or an external storage device. Also, in the case where a speaker is connected to the PLC 2, for example, the control unit 21 may perform the notification by audio.

As described above, the PLC 2 monitors whether there is a predictor of defect occurrence in the package WB to be formed by the packaging machine 3. The PLC 2 is able to monitor whether there is a predictor of defect occurrence in the package WB continuously and in real time, by repeatedly executing the processing of the above steps S201 to S205. Note that, in the case where plural types of defect events are set as monitoring targets, the control unit 21 is able to detect a predictor of the occurrence of each defect event, by executing the processing of the above steps S201 to S205 for every defect event.

Screen Display

Figure 13:
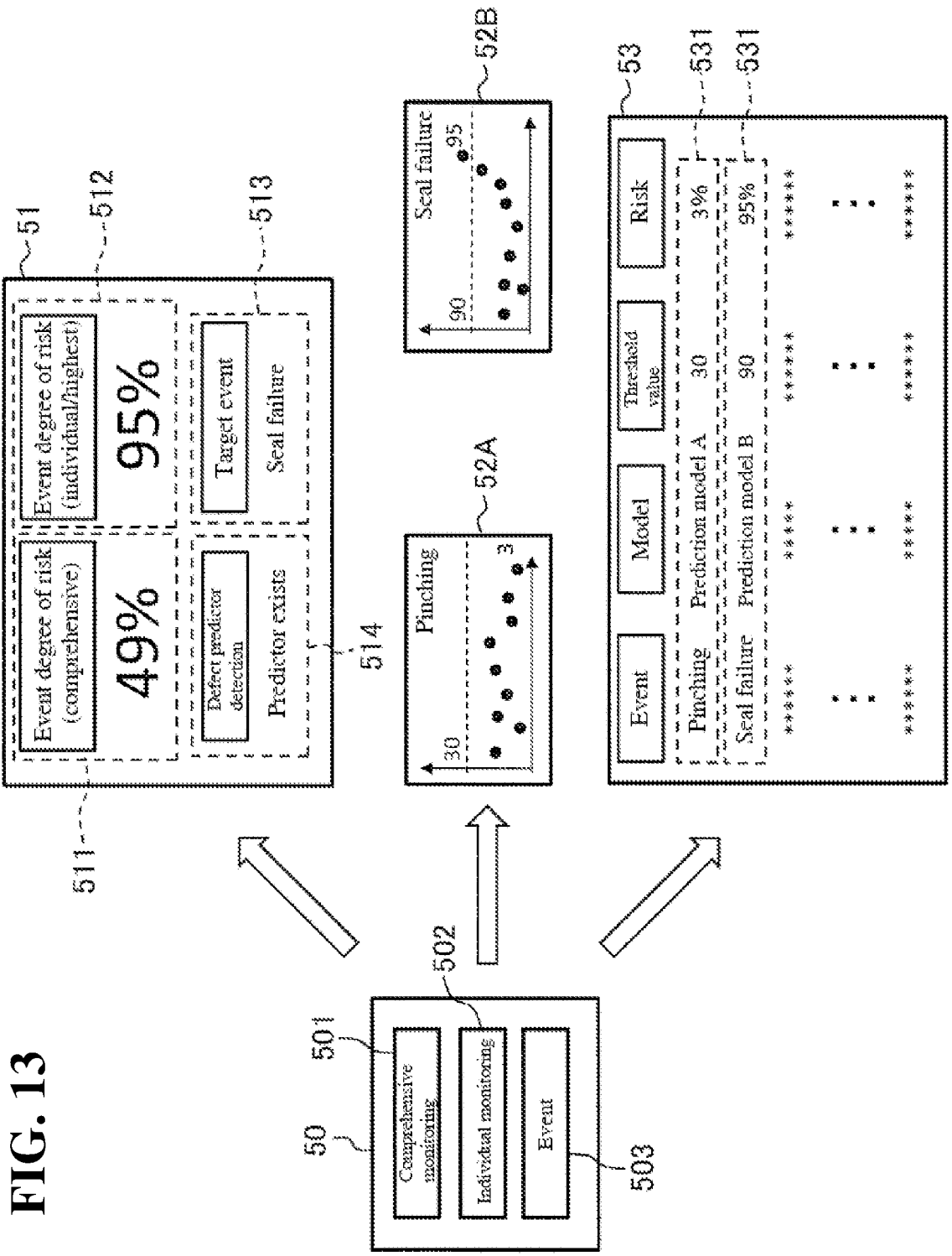
FIG. 13 is a diagram illustrating an example of screen transition in a display apparatus.

Next, an example of a screen that is displayed on the display apparatus 20 connected to the PLC 2, during monitoring processing of the above packaging machine 3, will be described using FIG. 13. FIG. 13 illustrates an example of screen transition of the display apparatus 20.

First, a top screen 50 is displayed on the display apparatus 20. A button 501 for transitioning to a comprehensive monitoring screen 51, a button 502 for transitioning to an individual monitoring screen (52A, 52B), and a button 503 for transitioning to a defect event list screen 53 are provided on the top screen 50. The administrator is able to switch the screen that is displayed on the display apparatus 20, by operating the buttons 501 to 503 via an input apparatus (not illustrated).

Comprehensive Monitoring Screen

Information for comprehensively monitoring predictors of defects that occur in the package WB to be formed by the packaging machine 3 is displayed on the comprehensive monitoring screen 51. In the example in FIG. 13, the comprehensive monitoring screen 51 includes a comprehensive event degree-of-risk display region 511, a highest event degree-of-risk display region 512, an event name display region 513 and a notification region 514.

The average of the probabilities that the defect events will arise, which are calculated in step S203, is displayed in the comprehensive event degree-of-risk display region 511. The highest probability among the probability values of the defect events that are calculated in step S203 is displayed in the highest event degree-of-risk display region 512.

Also, the name of the defect event whose probability value is displayed in the highest event degree-of-risk display region 512 is displayed in the event name display region 513. The notification of step S205 is displayed in the notification region 514. The administrator is able to confirm whether there is a predictor of defect occurrence in the package WB, by viewing display of the notification region 514.

Individual Monitoring Screen

A history of the probability values calculated by the above step S203 is displayed for each defect event on the individual monitoring screens (52A, 52B). The administrator is able to confirm the shift of the probability that each defect event will occur, by referring to the individual monitoring screens (52A, 52B). Note that, in the example in FIG. 13, the individual monitoring screen 52A shows the shift in the probability that pinching will occur in the package WB, and the individual monitoring screen 52B shows the shift in the probability that seal failure will occur in the package WB.

List Screen

A list of the defect events that are set as targets for predictor detection is displayed on the list screen 53. The name of the defect event, the prediction model that is utilized in predicting occurrence of the defect event, the threshold value that is utilized in the determination of step S204, and the probability that the target defect events will arise, which is calculated by step S203, at the point in time of display are displayed in each item 531. The administrator is able to confirm the setting information of each defect event and the probability (degree of risk) of occurrence of each defect event by viewing this list screen 53.

As a result of the above screens 51 to 53, the administrator is able to confirm in a multifaceted manner whether there is a predictor of defect occurrence in the package WB. The screen that is displayed in the display apparatus 20 is, however, not limited to such an example, and may be set as appropriate according to one or more embodiments. For example, a configuration may be adopted in which the notification of step S205 is displayed on the entire region of the screen, rather than a partial region such as the above notification region 514.

Operation and Effect

As described above, in one or more embodiments, by adopting a configuration that selects a feature amount effective in predicting a defect from plural types of feature amounts that can be calculated from the operating state data of the packaging machine 3, by the above step S102, a feature amount that is a possible cause of the defect is extracted. The prediction model 123 is then created, using the extracted feature amount, by the above step S103. Also, the PLC 2, by steps S203 and S204, determines whether there is a predictor indicating that a defect will arise in the package WB to be formed by the packaging machine 3, utilizing the prediction model 123 constructed by the extracted feature amount. Thus, with one or more embodiments, it can be appropriately predicted whether a defect will occur in the package WB to be formed by the packaging machine 3.

Also, in one or more embodiments, frame division of the operating state data 121 of the packaging machine 3 is performed in the takt time period. This takt time period is the time period taken to form a predetermined number of packages WB. Thus, the operating state of the packaging machine 3 at the time of forming the predetermined number of packages WB is appropriately reflected in the resultant frames. Thus, a feature amount can be appropriately acquired from each frame, and it can thereby be more appropriately predicted whether a defect will occur in the package WB to be formed by the packaging machine 3.

4 Modifications

Although one or more embodiments has been described above in detail, the aforementioned description is, in all respects, merely illustrative of the present invention. Needless to say, various improvements and modifications can be made without departing from the scope of the invention. For example, changes such as the following are possible. Note that, hereinafter, similar reference signs are used for constituent elements that are similar to the above embodiment, and description of points that are similar to the above embodiment will be omitted as appropriate. The following modifications can be combined as appropriate.

4.1

For example, in the above embodiment, the packaging machine 3 is illustrated as an example of a production facility. However, the production facility to be monitored for predictors of defect occurrence by the production facility monitoring system 100 is not limited to the packaging machine 3, and may be selected as appropriate according to one or more embodiments. The product that is produced is determined as appropriate according to the production facility. Also, the production facility monitoring system 100 is applicable not only to a production facility that is constituted by a single apparatus but also to a production facility that is constituted by a plurality of apparatuses.

Here, in the case where the production facility is constituted by a plurality of apparatuses, the target products are not necessarily processed simultaneously in the apparatuses. That is, in the operating state data that is obtained from each apparatus, the products that are to be processed in each frame do not necessarily coincide, even when frames of the same time are picked up. Thus, even when the feature amount is calculated from frames of the same time in the operating state data obtained from the apparatuses, there is a possibility of not being able to appropriately represent the state of the target product.

However, in one or more embodiments, frame division of the operating state data is performed based on the takt time period. Thus, the product that is to be processed in each frame is clear, and frames in which processing is being performed on the same product can be easily associated between the operating state data obtained from the apparatuses.

Figure 14:
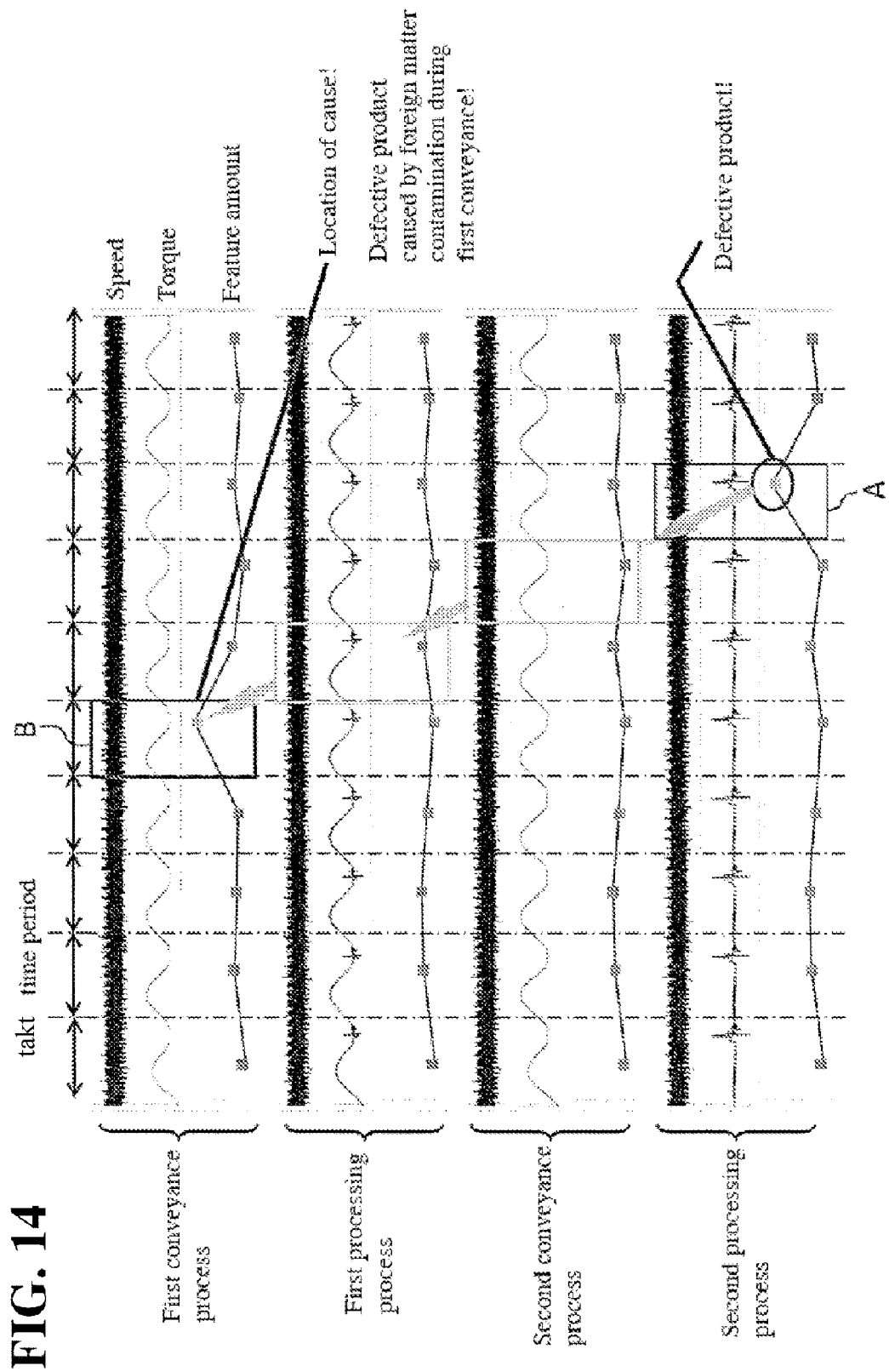
FIG. 14 is a diagram schematically illustrating a method of specifying the location of a cause of defect occurrence that utilizes a takt time period.

This association is illustrated in FIG. 14, for example. FIG. 14 illustrates the relationship between the operating state data that is obtained from each apparatus and the takt time period, in a scenario in which four processes (first conveyance, first processing, second conveyance, second processing) are sequentially performed by four apparatuses. In the example in FIG. 14, each apparatus passes the target product to the following process whenever one takt time period elapses.

Thus, as illustrated in FIG. 14, frames that are shifted by one takt time period from an upstream process to a downstream process correspond to frames in which processing is performed on the same product. Frames in which processing is performed on the same product in a plurality of apparatuses can thus be easily associated, by performing frame division of the operating state data based on the takt time period.

Note that in the case where it is detected that a defect has occurred in the product that is produced in frame A of the second processing process, the value of the feature amount that is calculated from frame B of the first conveyance process corresponding to this frame A is assumed to have been a peculiar value. In this case, it can be surmised that the cause of the defect in the product discovered in frame A is the processing in frame B. Associating frames in which processing is being performed on the same product based on the takt time period is thus also useful in investigating the cause of a defect that has occurred in a product. The method of performing frame division of the operating state data is, however, not limited to a method that is based on the takt time period, and may be selected as appropriate according to one or more embodiments. For example, for utilization in frequency analysis or the like, frame division of the operating state data may be performed in units of time specified in advance.

4.2

Also, for example, in the above embodiment, the PLC 2 is illustrated as an example of the monitoring apparatus of one or more embodiments. However, the monitoring apparatus of one or more embodiments need not be particularly limited as long as it is a computer provided with a processor and a memory and capable of computational processing. For example, in the above embodiment, a general-purpose computer such as a PC (Personal Computer) or a tablet terminal, may be used instead of the PLC 2. Also, the monitoring apparatus may be implemented by a plurality of computers.

Also, for example, in the above embodiment, the prediction model creation apparatus 1 and the PLC 2 are constituted by separate computers. However, the prediction model creation apparatus 1 and the PLC 2 may be constituted by one computer. That is, one computer may be provided with the functions of both the prediction model creation apparatus and the monitoring apparatus.

4.3

Also, for example, in the above embodiment, in step S102, a feature amount that is utilized in creating the prediction model 123 is selected, utilizing a Bayesian network as a predetermined algorithm that derives the degree of association between a defect that occurs in the product and each feature amount. However, the predetermined algorithm that derives the degree of association between a defect that occurs in a product and each feature amount need not be limited to a Bayesian network, and may be selected as appropriate according to one or more embodiments. Apart from the above Bayesian network, in the above step S102, for example, a decision tree, logistic regression analysis or a neural network can be utilized as a predetermined algorithm that derives the degree of association between a defect that occurs in a project and each feature amount.

In the case where a decision tree is utilized as the above predetermined algorithm, the degree of association (also referred to as degree of importance or degree of contribution) of each feature amount (explanatory variable) can be derived by the random forest method or the like. Specifically, when creating a decision tree, nodes (branches) are selected from the feature amounts (explanatory variables), such that the degree of impurity that is indicated by the Gini coefficient, cross entropy or the like decreases. Thus, the amount of reduction in the degree of impurity at the time of selecting feature amounts (explanatory variables) as nodes can be utilized as the degree of importance of those feature amounts (explanatory variables). In the above step S102, a configuration may be adopted in which a feature amount effective in predicting defect occurrence is selected from among plural types of feature amounts, utilizing this degree of importance.

Also, in the case where logistic regression analysis is utilized as the above predetermined algorithm, an information criterion (AIC, BIC) can be utilized as an evaluation index (degree of association). In this case, in the above step S102, when changing the feature amounts with a method such as the variable increasing method, the variable decreasing method or the variable increasing and decreasing method, a combination of feature amounts that minimize the information criterion may be selected as feature amounts effective in predicting defect occurrence.

Also, in the case where a neural network is utilized as the above predetermined algorithm, a neural network whose input is the values of feature amounts and whose output is the state of the product is constructed. The configuration of the neural network may be selected as appropriate according to one or more embodiments. The constructed neural network is then trained as appropriate, with the collected operating state data 121 as learning data. Specifically, training of the neural network is performed until the state of the target product is output when the values of feature amounts are input to the neural network.

In this neural network, feature amounts that are input to neurons to which large coefficients are provided have a high degree of association with the state of products which are the output of the neural network. Thus, in the above step S102, a configuration may be adopted in which one or a plurality of feature amounts are selected in descending order from the feature amount in which the neuron has the largest coefficient, as feature amounts effective in predicting defect occurrence.

4.4

Also, for example, in the above embodiment, the conditional probability table illustrated in FIG. 11 was illustrated as the prediction model 123 that is constructed in step S103. However, the prediction model 123 need not be limited to such a conditional probability table, and may be set as appropriate according to one or more embodiments.

Decision Tree

For example, the control unit 11 may create a decision tree that utilizes the feature amounts (explanatory variables) selected in step S102 for branches as the prediction model 123. The decision tree can be created by a well-known method. The output of the decision tree can be shown by the ratio of the number of instances of normal data and defective data out of learning data classified into leaves. In this case, in a scenario in which the packaging machine 3 is monitored, the control unit 21 of the PLC 2 is able to output the probability of a defect occurring, by applying the values of the feature amounts calculated in step S202 to the decision tree. Thus, in step S204, the control unit 21 is able to determine whether there is a predictor of defect occurrence in the package WB to be formed by the packaging machine 3, based on that output.

Logistic Regression Model

Also, for example, the control unit 11 may create a logistic regression model that utilizes the feature amounts selected in step S102 as the prediction model 123. The logistic regression model can be created by a well-known method. This logistic regression model can be created so as to output the probability of a defect occurring. In this case, in a scenario in which the packaging machine 3 is monitored, the control unit 21 of the PLC 2 is able to output the probability of a defect occurring, by applying the values of the feature amounts calculated in step S202 to the logistic regression model. Thus, in step S204, the control unit 21 is able to determine whether there is a predictor of defect occurrence in the package WB to be formed by the packaging machine 3, based on that output.

Outlier

Also, for example, the control unit 11 may create, as the prediction model 123, a determination condition for determining whether a defect has occurred in the package WB based on an outlier (LOF (Local Outlier Factor) value) that is calculated utilizing the feature amounts selected in step S102. The LOF value is a value indicating the amount of deviation from a given data group. In other words, as the LOF value that is calculated with the data group obtained at the normal time and the data (operating state data) obtained in step S201 at the time of monitoring out of the learning data increases, the data obtained at the time of monitoring will deviate more from the data group obtained at the normal time, and the possibility of a defect occurring in the package WB to be formed by the packaging machine 3 increases. Also, as the LOF value that is calculated with the data group obtained at the defective time and the data (operating state data) obtained in step S201 at the time of monitoring out of the learning data decreases, the data obtained at the time of monitoring will more closely approximate the data group obtained at the defective time, and the possibility of a defect occurring in the package WB to be formed by the packaging machine 3 increases. Thus, it can be determined whether a defect has occurred in the package WB, depending on the LOF value of the operating state data that is calculated for the data group obtained at the normal time or the data group obtained at the defective time. Therefore, the determination condition for determining whether a defect has occurred in the package WB based on this LOF value can be utilized as the prediction model 123. Note that calculation of the LOF value can be performed by the following (A) to (E).

(A) k-distance(p)

The distance between data o and data p that satisfies the relationship of the following equation 2 is defined as k-distance(p).

Equation 2:
  (i) for at least the number k of the data o' ∈ D−{p}, "d(p, o')≤d(p, o)" holds, and
  (ii) for at most the number k−1 of the data o' ∈D−{p}, "d(p, o')<d(p, o)" holds.

Here, D shows the data group obtained at the normal time or the defective time. k shows the number of instances of data in D and is an arbitrary positive number. p is data that is acquired in step S201 at the time of monitoring, and o is data that is included in D. d(p, o) shows the distance between data p and data o.

(B) $N_{k\text{-}distance(p)}(p)$

When the k-distance(p) of data p is given as described (A) above, the data $N_{k\text{-}distance(p)}(p)$ that is included in k nearest neighbors of data p is defined in accordance with the following equation 3.

$$N_{k\text{-}distance(p)}(p)=\{q \in D-\{p\} | d(p,q) \leq k\text{-distance}(p)\} \quad \text{Equation 3}$$

(C) Reachable Distance reach-dist$_k$(p, o)

The reachable distance reach-dist$_k$(p, o) relating to data o of the data of data p is defined in accordance with the following equation 4.

$$\text{reach-dist}_k(p,o)=\max\{k\text{-distance}(o), d(p,o)\} \quad \text{Equation 4}$$

(D) Locally Reachable Density lrd$_k$(p)

The reciprocal of the average of the range of data in k neighbors of data p is defined in accordance with the following equation 5 as the locally reachable density lrd$_k$(p).

$$lrd_k(p) = \frac{|N_k(p)|}{\sum_{o \in N_k(p)} \text{reach} - dist_k(p, o)} \quad \text{Equation 5}$$

(E) LOF Value: LOF$_k$(p)

The LOF value LOF$_k$(p) can be defined as in the following equation 6, utilizing (A) to (D) above.

$$LOF_k(p) = \frac{\sum_{o \in N_k(p)} \frac{lrd_k(o)}{lrd_k(p)}}{|N_k(p)|} \quad \text{Equation 6}$$

At the time of creating a prediction model, the control unit 11 of the prediction model creation apparatus 1 may determine a threshold condition premised on the calculation conditions of the above LOF value, as a determination condition for determining whether a defect has occurred in the package WB. The method of determining the threshold value serving as the basis of defect occurrence can be selected as appropriate according to one or more embodiments. Also, in the case where the determination of whether a defect has occurred in the package WB is performed stepwise, a plurality of threshold values may be set.

For example, in the case where the data group obtained at the normal time is utilized as the data group serving as the base for calculating the LOF value, the control unit 11 may calculate the LOF value of the data at the defective time acquired in step S101, by the above calculation, and set the minimum, average or the like of the calculated LOF value as the threshold value serving as the determination condition. The LOF value can also be similarly set, in the case where the data group obtained at the defective time is utilized as the data group serving as the base for calculating the LOF value. The threshold condition that is thereby set and the above calculation conditions of the LOF value serve as the prediction model 123. Note that the data group serving as the base for calculating the LOF value may be updated as required.

On the other hand, at the time of monitoring the packaging machine 3, the PLC 2 is able to determine whether there is a predictor of defect occurrence in the package WB to be formed by the packaging machine 3, utilizing the created determination condition, that is, the threshold value of the LOF value. Specifically, the control unit 21 of the PLC 2 calculates the LOF value of the data obtained in step S201, by the above calculation. The control unit 21 is then able to determine whether there is a predictor of defect occurrence in the package WB to be formed by the packaging machine 3, by comparing the calculated LOF value and the threshold value set as the above prediction model 123.

Note that the method of determining whether there is a predictor of defect occurrence in the package WB at the time of monitoring the packaging machine 3 need not be limited to such an example. For example, the control unit 21 may derive the distribution of LOF values from several instances of the data obtained in step S201, using a function capable of specifying the distribution of a probability density function or the like. The control unit 21 may then calculate the rate at which a defect is determined by the above threshold value in the obtained distribution of LOF values, and output the calculated rate as the probability that a defect will occur in the package WB. Also, the control unit 21 may determine whether there is a predictor of defect occurrence in the package WB to be formed by the packaging machine 3, based on the calculated probability.

Mahalanobis Distance

Also, for example, the control unit 11 may create, as the prediction model 123, a determination condition for determining whether a defect has occurred in the package WB based on the Mahalanobis distance that is calculated utilizing the feature amounts selected in step S102. The Mahalanobis distance $M_i$ is, for example, given by the following equation 7, and shows a multidimensional distance that takes account of the correlation between variables.

$$M_i = \sqrt{(Y_i - Y)^T S^{-1} (Y_i - Y)} \quad \text{Equation 7}$$

Here, Y indicates a mean vector and $Y_i$ indicates i-th data. Also, S indicates a variance-covariance matrix.

In the above step S103, the control unit 11 first calculates the Mahalanobis distance with the feature amounts selected in step S102 as variables, with regard to the operating state data obtained at the defective time and the normal time. The Mahalanobis distance for each instance of operating state data acquired at the normal time and the Mahalanobis distance for each instance of operating state data acquired at the defective time are thereby calculated. Next, the control unit 11 sets a threshold value for separating the Mahalanobis distance for each instance of operating state data acquired at the normal time and the Mahalanobis distance for each instance of operating state data acquired at the defective time, as the threshold condition for the Mahalanobis distance. This threshold value serves as the determination condition for determining whether a defect has occurred in the package WB. That is, the threshold condition that is thereby set serves as the prediction model 123.

Figure 15:
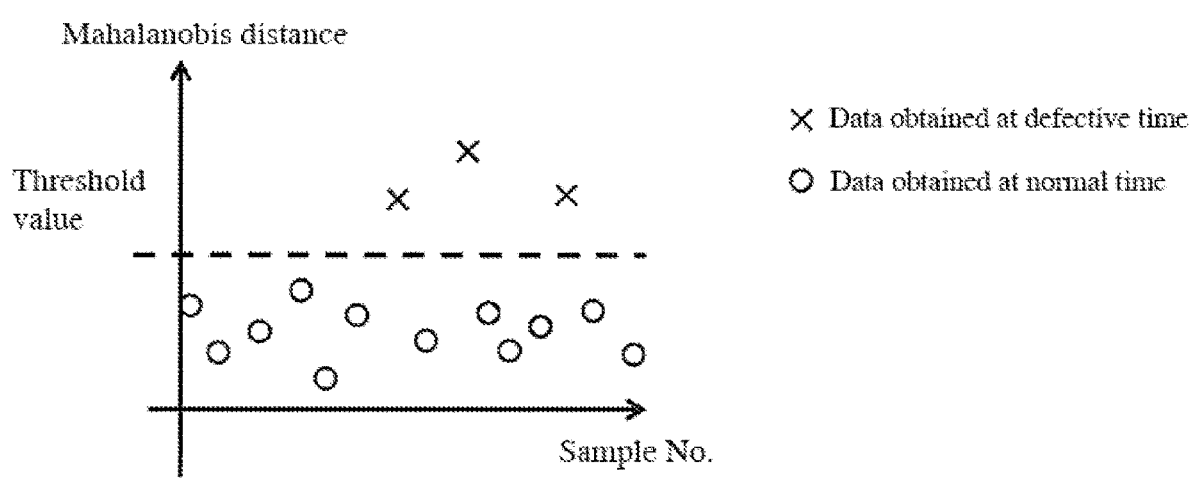
FIG. 15 is a diagram illustrating an example of a prediction model according to another form.

FIG. 15 illustrates an example of the threshold condition for the Mahalanobis distance. In the example in FIG. 15, the value of the Mahalanobis distance of the data obtained at the normal time is small, the value of the Mahalanobis distance of the data obtained at the defective time is large, and the threshold value is set to a value that divides these values. As this threshold value, for example, the minimum of the Mahalanobis distance of the data obtained at the defective time may be adopted, the average of the Mahalanobis distance of the data obtained at the defective time may be adopted, or the value of the upper control limit (UCL) that is calculated from the Mahalanobis distance of instances of data obtained at the normal time may be adopted. The method of setting the threshold value can be selected as appropriate according to one or more embodiments. Also, in the case where the determination of whether a defect has occurred in the package WB is performed stepwise, a plurality of threshold values may be set.

In this case, at the time of monitoring the packaging machine 3, the PLC 2 is able to calculate the Mahalanobis distance of the data obtained in step S201, using the values of the feature amounts calculated in step S202. The PLC 2 is then able to determine whether there is a predictor of defect occurrence in the package WB to be formed by the packaging machine 3, by comparing the calculated value of the Mahalanobis distance and the threshold value set as the above prediction model 123.

Note that the method of determining whether there is a predictor of defect occurrence in the package WB at the time of monitoring the packaging machine 3 need not be limited to such an example. For example, the control unit 21 may derive the distribution of the values of the Mahalanobis distance from several instances of the data obtained in step S201, using a function capable of specifying the distribution of a probability density function or the like. The control unit 21 may then calculate the rate at which a defect is determined by the above threshold value in the obtained distribution of the acquired values of the Mahalanobis distance, and may output the calculated rate as the probability that a defect will occur in the package WB. Also, the control unit 21 may determine whether there is a predictor of defect occurrence in the package WB to be formed by the packaging machine 3, based on the calculated probability.

Other Matters

Note that the method of creating the prediction model 123 need not be limited to examples such as the above, and may be selected as appropriate according to one or more embodiments. For example, apart from the above, the values of the feature amounts selected in step S102 may be directly adopted as the prediction model 123, or a linear regression model may be adopted.

For example, in the case of directly adopting the values of the feature amounts, the control unit 11, in the above step S103, sets the range of values for determining that there is a predictor of a defect, for the feature amounts selected in step S102, based on the operating state data acquired at the defective time. This range of values set for each feature amount serves as the prediction model 123. In this case, at the time of monitoring the packaging machine 3, the PLC 2 is able to determine whether there is a predictor of defect occurrence in the package WB to be formed by the packaging machine 3, by determining whether the values of the feature amounts calculated in step S202 falls within that range.

Also, for example, in the case of adopting a linear regression model, the control unit 11 creates a linear regression model that utilizes the feature amounts selected in the above step S102, with regard to data obtained at the normal time or the defective time. This linear regression model and the threshold condition serve as the prediction model 123. In this case, at the time of monitoring the packaging machine 3, the PLC 2 is able to determine whether there is a predictor of defect occurrence in the package WB to be formed by the packaging machine 3, by applying the values of the feature amounts calculated in step S202 to the linear regression model, and comparing the value that is obtained and the threshold value.

4.5

Also, for example, in the above embodiment, the determination of whether there is a predictor of defect occurrence is performed in step S204, based on the comparison of the value of the probability of defect occurrence that is calculated by the conditional probability table and the threshold value. However, the above determination of whether there is a predictor of defect occurrence need not be limited to such an example, and the degree of possibility of defect occurrence may be determined using a plurality of threshold values in step S204.

For example, as the plurality of threshold values, a first threshold value that determines the level at which attention is drawn to defect occurrence and a second threshold value that is a higher value than the first threshold value and determines the level at which warning of defect occurrence is performed may be set. In this case, the control unit 21, when the value of the probability that a defect will occur in a product calculated using a conditional probability table is less than or equal to the first threshold value, may determine that the probability of a defect arising in the product is low, and omit the notification processing of step S205. Also, when the calculated value of the probability that a defect will arise in the product is higher than the first threshold value and less than or equal to the second threshold value, the control unit 21 may determine the possibility of a defect arising in the product is high, and may draw the administrator's attention to the defect occurrence, by the notification of step S205. Furthermore, when the calculated value of the probability that a defect will arise in the product is higher than the second threshold value, the control unit 21 may determine that there is an extremely high possibility of a defect arising in the product, and issue a warning of defect occurrence to the administrator, by the notification of step S205.

The invention claimed is:

1. A prediction model creation apparatus comprising a processor configured with a program to perform operations comprising:
    operation as a feature amount acquisition unit configured to acquire values of a plurality of feature amounts, calculated from operating state data indicating an operating state of a production facility that produces a product, at a normal time at which the production facility produces the product normally, and values of the plurality of feature amounts at a defective time at which a defect occurs in the product;
    operation as a feature amount selection unit configured to select at least one of the plurality of feature amounts as effective in predicting the defect based on a predetermined algorithm that specifies degrees of association between the defect and the plurality of feature amounts, based on the values of the plurality of feature amounts acquired at the normal time and the values of plurality of feature amounts acquired at the defective time, the degrees of association comprising values corresponding to an influence of each of the plurality feature amounts on the operating state of the production facility; and
    operation as a prediction model construction unit configured to construct a prediction model for predicting occurrence of the defect, using the selected at least one of the plurality of feature amounts, the prediction model comprising a conditional probability table in which the selected at least one feature amount comprises a random variable and in which a causal relationship between the random variable associated with the at least one feature amount and at least one other random variable associated with at least one other feature amount are represented as a conditional probability.

2. The prediction model creation apparatus according to claim 1, wherein the processor is configured with the program such that operation as the feature amount acquisition unit comprises calculating the values of the plurality of feature amounts from the operating state data divided every takt time period taken to produce a predetermined number of the product.

3. The prediction model creation apparatus according to claim 1, wherein the processor is configured with the program such that operation as the feature amount selection unit comprises specifying the degrees of association between the defect and the plurality of feature amounts utilizing one of a Bayesian network, a decision tree, logistic regression analysis, and a neural network as the predetermined algorithm, and select the at least one feature amount effective in predicting the defect from among the plurality of feature amounts, based on the specified degrees of association.

4. The prediction model creation apparatus according to claim 2, wherein the processor is configured with the program such that operation as the feature amount selection unit comprises specifying the degrees of association between the defect and the plurality of feature amounts, utilizing one of a Bayesian network, a decision tree, logistic regression analysis, and a neural network as the predetermined algorithm, and select the at least one feature amount effective in predicting the defect from among the plurality of feature amounts, based on the specified degrees of association.

5. The prediction model creation apparatus according to claim 1, wherein the prediction model further comprises one of: a decision tree that utilizes the selected at least one of the plurality of feature amounts as a branch; a logistic regression model that utilizes the selected at least one of the plurality of feature amounts; a determination condition for determining occurrence of the defect based on an outlier that is calculated utilizing the selected at least one of the plurality of feature amounts; and a determination condition for determining occurrence of the defect based on a Mahalanobis distance that is calculated utilizing the selected at least one of the plurality of feature amounts.

6. The prediction model creation apparatus according to claim 2 wherein the prediction model further comprises one of: a decision tree that utilizes the selected at least one of the plurality of feature amounts as a branch; a logistic regression model that utilizes the selected at least one of the plurality of feature amounts; a determination condition for determining occurrence of the defect based on an outlier that is calculated utilizing the selected at least one of the plurality of feature amounts; and a determination condition for determining occurrence of the defect based on a Mahalanobis distance that is calculated utilizing the selected at least one of the plurality of feature amounts.

7. The prediction model creation apparatus according to claim 3, wherein the prediction model further comprises one of: a decision tree that utilizes the selected at least one of the plurality of feature amounts as a branch; a logistic regression model that utilizes the selected at least one of the plurality of feature amounts; a determination condition for determining occurrence of the defect based on an outlier that is calculated utilizing the selected at least one of the plurality of feature amounts; and a determination condition for determining occurrence of the defect based on a Mahalanobis distance that is calculated utilizing the selected at least one of the plurality of feature amounts.

8. The prediction model creation apparatus according to claim 4, wherein the prediction model further comprises one of: a decision tree that utilizes the selected at least one of the plurality of feature amounts as a branch; a logistic regression model that utilizes the selected at least one of the plurality of feature amounts; a determination condition for determining occurrence of the defect based on an outlier that is calculated utilizing the selected at least one of the plurality of feature amounts; and a determination condition for determining occurrence of the defect based on a Mahalanobis distance that is calculated utilizing the selected at least one of the plurality of feature amounts.

9. A production facility monitoring system comprising:
the prediction model creation apparatus according to claim 1; and
a monitoring apparatus comprising a processor configured with a program to perform operations comprising acquiring operating state data from a production facility during operation, calculating a value of a feature amount used in the prediction model from the acquired operating state data, and determining whether the feature amount is a predictor of defect occurrence in a product that the production facility produces, by applying the calculated value of the feature amount to the prediction model.

10. A production facility monitoring system comprising:
the prediction model creation apparatus according to claim 2; and
a monitoring apparatus comprising a processor configured with a program to perform operations comprising acquiring operating state data from a production facility during operation, calculating a value of a feature amount used in the prediction model from the acquired operating state data, and determining whether the feature amount is a predictor of defect occurrence in a product that the production facility produces, by applying the calculated value of the feature amount to the prediction model.

11. A production facility monitoring system comprising:
the prediction model creation apparatus according to claim 3; and
a monitoring apparatus comprising a processor configured with a program to perform operations comprising acquiring operating state data from a production facility during operation, calculating a value of a feature amount used in the prediction model from the acquired operating state data, and determining whether the feature amount is a predictor of defect occurrence in a product that the production facility produces, by applying the calculated value of the feature amount to the prediction model.

12. A production facility monitoring system comprising:
the prediction model creation apparatus according to claim 4; and
a monitoring apparatus comprising a processor configured with a program to perform operations comprising acquiring operating state data from a production facility during operation, calculating a value of a feature amount used in the prediction model from the acquired operating state data, and determining whether the feature amount is a predictor of defect occurrence in a product that the production facility produces, by applying the calculated value of the feature amount to the prediction model.

13. A production facility monitoring system comprising:
the prediction model creation apparatus according to claim 5; and
a monitoring apparatus comprising a processor configured with a program to perform operations comprising acquiring operating state data from a production facility during operation, calculating a value of a feature amount used in the prediction model from the acquired operating state data, and determining whether the feature amount is a predictor of defect occurrence in a product that the production facility produces, by applying the calculated value of the feature amount to the prediction model.

14. A production facility monitoring system comprising:
the prediction model creation apparatus according to claim 6; and
a monitoring apparatus comprising a processor configured with a program to perform operations comprising acquiring operating state data from a production facility during operation, calculating a value of a feature amount used in the prediction model from the acquired operating state data, and determining whether the feature amount is a predictor of defect occurrence in a product that the production facility produces, by applying the calculated value of the feature amount to the prediction model.

15. A production facility monitoring system comprising:
the prediction model creation apparatus according to claim 7; and
a monitoring apparatus comprising a processor configured with a program to perform operations comprising acquiring operating state data from a production facility during operation, calculating a value of a feature amount used in the prediction model from the acquired operating state data, and determining whether the feature amount is a predictor of defect occurrence in a product that the production facility produces, by applying the calculated value of the feature amount to the prediction model.

16. A production facility monitoring system comprising:
the prediction model creation apparatus according to claim 8; and
a monitoring apparatus comprising a processor configured with a program to perform operations comprising acquiring operating state data from a production facility during operation, calculating a value of a feature amount used in the prediction model from the acquired operating state data, and determining whether the feature amount is a predictor of defect occurrence in a product that the production facility produces, by applying the calculated value of the feature amount to the prediction model.

17. The production facility monitoring system according to claim 9, wherein the processor of the monitoring apparatus is configured with the program to perform operations comprising, in response to determining that the feature amount is a predictor of defect occurrence in the product that the production facility produces, notifying an administrator of the production facility that the feature amount is the predictor of defect occurrence.

18. The production facility monitoring system according to claim 10, wherein the processor of the monitoring apparatus is configured with the program to perform operations comprising, in response to determining that the feature amount is a predictor of defect occurrence in the product that the production facility produces, notifying an administrator of the production facility that the feature amount is the predictor of defect occurrence.

19. The production facility monitoring system according to claim 11, wherein the processor of the monitoring apparatus is configured with the program to perform operations comprising, in response to determining that the feature amount is a predictor of defect occurrence in the product that the production facility produces, notifying an administrator of the production facility that the feature amount is the predictor of defect occurrence.

20. A production facility monitoring method comprising:

acquiring values of a plurality of feature amounts, calculated from operating state data indicating an operating state of a production facility that produces a product, at a normal time at which the production facility produces the product normally, and values of the plurality of feature amounts at a defective time at which a defect occurs in the product;

selecting at least one of the plurality of feature amounts as effective in predicting the defect based on a predetermined algorithm that specifies degrees of association between the defect and the plurality of feature amounts, based on the values of the plurality of feature amounts acquired at the normal time and the values of the plurality of feature amounts acquired at the defective time, the degrees of association comprising values corresponding to an influence of each of the plurality of feature amounts on the operating state of the production facility;

constructing a prediction model for predicting occurrence of the defect, using the selected at least one of the plurality of feature amounts, the prediction model comprising a conditional probability table in which the selected at least one feature amount comprises a random variable and in which a causal relationship between the random variable associated with the at least one feature amount and at least one other random variable associated with at least one other feature amount are represented as a conditional probability;

acquiring operating state data from the production facility during operation;

calculating a value of the selected at least one of the plurality of feature amounts used in the prediction model from the acquired operating state data; and determining whether there is a predictor of defect occurrence in the product by applying the calculated value of the selected at least one of the plurality of feature amounts to the prediction model.

* * * * *